(12) United States Patent
Hinckley et al.

(10) Patent No.: US 8,902,181 B2
(45) Date of Patent: Dec. 2, 2014

(54) MULTI-TOUCH-MOVEMENT GESTURES FOR TABLET COMPUTING DEVICES

(75) Inventors: Kenneth P. Hinckley, Redmond, WA (US); Michel Pahud, Kirkland, WA (US); William A. S. Buxton, Toronto (CA)

(73) Assignee: Microsoft Corporation, Redmond, WA (US)

(*) Notice: Subject to any disclaimer, the term of this patent is extended or adjusted under 35 U.S.C. 154(b) by 248 days.

(21) Appl. No.: 13/367,377

(22) Filed: Feb. 7, 2012

(65) Prior Publication Data

US 2013/0201113 A1 Aug. 8, 2013

(51) Int. Cl.
G06F 3/041 (2006.01)

(52) U.S. Cl.
USPC .......................................... 345/173

(58) Field of Classification Search
None
See application file for complete search history.

(56) References Cited

U.S. PATENT DOCUMENTS

| | | | |
|---|---|---|---|
| 5,198,623 A | 3/1993 | Landmeier | |
| 5,414,227 A | 5/1995 | Schubert et al. | |
| 5,463,725 A | 10/1995 | Henckel et al. | |
| 5,625,833 A | 4/1997 | Levine | |
| 5,867,163 A | 2/1999 | Kurtenbach | |
| 5,956,020 A | 9/1999 | D'Amico et al. | |
| 6,307,548 B1 | 10/2001 | Flinchem et al. | |
| 6,906,703 B2 | 6/2005 | Vablais et al. | |
| 7,231,609 B2 | 6/2007 | Baudisch | |
| 7,289,102 B2 | 10/2007 | Hinckley | |
| 7,362,221 B2 | 4/2008 | Katz | |
| 7,400,316 B2 | 7/2008 | Appleyard et al. | |
| 7,499,024 B2 | 3/2009 | Johnston, Jr. et al. | |
| 7,532,196 B2 | 5/2009 | Hinckley | |
| 7,567,242 B2 | 7/2009 | Perkins et al. | |
| 7,703,047 B2 | 4/2010 | Keely et al. | |
| 7,812,826 B2 | 10/2010 | Ording et al. | |

(Continued)

FOREIGN PATENT DOCUMENTS

| | | |
|---|---|---|
| CN | 101809581 A | 8/2010 |
| KR | 1020010041283 A | 5/2001 |
| KR | 1020120005417 A1 | 1/2012 |
| WO | 2009084809 A1 | 7/2009 |

OTHER PUBLICATIONS

Hinckley, et al., "Sensor Synaesthesia: Touch in Motion, and Motion in Touch," retrieved at <<http://research.microsoft.com/en-us/um/people/kenh/all-published-papers/sensor-synaesthesia-chi-2011.pdf>>, Proceedings of the 2011 Annual Conference on Human Factors in Computing Systems, May 2011, 10 pages.

(Continued)

*Primary Examiner* — Adam R Giesy
(74) *Attorney, Agent, or Firm* — Micah Goldsmith; Judy Yee; Micky Minhas

(57) ABSTRACT

Functionality is described herein for detecting and responding to gestures performed by a user using a computing device, such as, but not limited to, a tablet computing device. In one implementation, the functionality operates by receiving touch input information in response to the user touching the computing device, and movement input information in response to the user moving the computing device. The functionality then determines whether the input information indicates that a user has performed or is performing a multi-touch-movement (MTM) gesture. The functionality can then perform any behavior in response to determining that the user has performed an MTM gesture, such as by modifying a view or invoking a function, etc.

20 Claims, 14 Drawing Sheets

(56) References Cited

U.S. PATENT DOCUMENTS

| | | | |
|---|---|---|---|
| 7,812,828 B2 | 10/2010 | Westerman et al. | |
| 7,847,789 B2 | 12/2010 | Kolmykov-Zotov et al. | |
| 7,956,847 B2 | 6/2011 | Christie | |
| 7,982,739 B2 | 7/2011 | Pasula | |
| 8,228,292 B1 | 7/2012 | Ruiz et al. | |
| 8,265,705 B2 | 9/2012 | Lee | |
| 8,413,077 B2 | 4/2013 | Yamamoto et al. | |
| 2003/0076310 A1 | 4/2003 | Kanzaki et al. | |
| 2003/0164821 A1 | 9/2003 | Rezania | |
| 2004/0012575 A1 | 1/2004 | Homer et al. | |
| 2004/0047505 A1 | 3/2004 | Ghassabian | |
| 2004/0140962 A1 | 7/2004 | Wang et al. | |
| 2004/0203520 A1 | 10/2004 | Schirtzinger et al. | |
| 2005/0024346 A1 | 2/2005 | Dupraz et al. | |
| 2005/0079896 A1 | 4/2005 | Kokko et al. | |
| 2005/0179648 A1 | 8/2005 | Barabe et al. | |
| 2005/0216867 A1 | 9/2005 | Marvit et al. | |
| 2005/0253817 A1 | 11/2005 | Rytivaara et al. | |
| 2006/0012580 A1 | 1/2006 | Perski et al. | |
| 2006/0026535 A1 | 2/2006 | Hotelling et al. | |
| 2006/0109252 A1 | 5/2006 | Kolmykov-Zotov et al. | |
| 2006/0136840 A1 | 6/2006 | Keely et al. | |
| 2006/0146038 A1 | 7/2006 | Park et al. | |
| 2006/0177112 A1 | 8/2006 | Yang et al. | |
| 2006/0197750 A1 | 9/2006 | Kerr et al. | |
| 2006/0197753 A1 | 9/2006 | Hotelling | |
| 2006/0256008 A1 | 11/2006 | Rosenberg | |
| 2006/0267957 A1 | 11/2006 | Kolmykov-Zotov et al. | |
| 2006/0267958 A1 | 11/2006 | Kolmykov-Zotov et al. | |
| 2007/0002016 A1 | 1/2007 | Cho et al. | |
| 2007/0070051 A1 | 3/2007 | Westerman et al. | |
| 2007/0075965 A1 | 4/2007 | Huppi et al. | |
| 2007/0113198 A1 | 5/2007 | Robertson et al. | |
| 2007/0126732 A1 | 6/2007 | Robertson et al. | |
| 2007/0152976 A1 | 7/2007 | Townsend et al. | |
| 2007/0268274 A1 | 11/2007 | Westerman et al. | |
| 2008/0002888 A1 | 1/2008 | Yuan | |
| 2008/0012835 A1 | 1/2008 | Rimon et al. | |
| 2008/0040692 A1 | 2/2008 | Sunday et al. | |
| 2008/0106520 A1 | 5/2008 | Free et al. | |
| 2008/0158145 A1 | 7/2008 | Westerman | |
| 2008/0158168 A1 | 7/2008 | Westerman et al. | |
| 2008/0163130 A1 | 7/2008 | Westerman | |
| 2008/0191898 A1 | 8/2008 | Janik | |
| 2008/0292195 A1 | 11/2008 | Vijayasenan et al. | |
| 2009/0066663 A1 | 3/2009 | Chang et al. | |
| 2009/0073144 A1 | 3/2009 | Chen et al. | |
| 2009/0109182 A1 | 4/2009 | Fyke et al. | |
| 2009/0153525 A1 | 6/2009 | Chang | |
| 2009/0160816 A1 | 6/2009 | Westerman et al. | |
| 2009/0167702 A1 | 7/2009 | Nurmi | |
| 2009/0178007 A1 | 7/2009 | Matas et al. | |
| 2009/0209285 A1 | 8/2009 | McMahan | |
| 2009/0228842 A1 | 9/2009 | Westerman et al. | |
| 2009/0259969 A1 | 10/2009 | Pallakoff | |
| 2009/0262074 A1 | 10/2009 | Nasiri et al. | |
| 2009/0265671 A1 | 10/2009 | Sachs et al. | |
| 2009/0267896 A1 | 10/2009 | Hiramatsu | |
| 2010/0007618 A1 | 1/2010 | Park et al. | |
| 2010/0020025 A1 | 1/2010 | Lemort et al. | |
| 2010/0045705 A1 | 2/2010 | Vertegaal et al. | |
| 2010/0053095 A1 | 3/2010 | Wu et al. | |
| 2010/0053120 A1 | 3/2010 | Chang et al. | |
| 2010/0079493 A1 | 4/2010 | Tse et al. | |
| 2010/0083191 A1 | 4/2010 | Marshall | |
| 2010/0095234 A1 | 4/2010 | Lane et al. | |
| 2010/0103118 A1 | 4/2010 | Townsend et al. | |
| 2010/0123737 A1 | 5/2010 | Williamson et al. | |
| 2010/0127979 A1 | 5/2010 | Lee et al. | |
| 2010/0139990 A1 | 6/2010 | Westerman et al. | |
| 2010/0175018 A1 | 7/2010 | Petschnigg et al. | |
| 2010/0177121 A1 | 7/2010 | Homma et al. | |
| 2010/0188328 A1 | 7/2010 | Dodge et al. | |
| 2010/0194547 A1 | 8/2010 | Terrell et al. | |
| 2010/0214216 A1* | 8/2010 | Nasiri et al. | 345/158 |
| 2010/0235729 A1 | 9/2010 | Kocienda et al. | |
| 2010/0281435 A1 | 11/2010 | Bangalore et al. | |
| 2010/0295781 A1 | 11/2010 | Alameh et al. | |
| 2010/0295799 A1 | 11/2010 | Nicholson et al. | |
| 2010/0298033 A1* | 11/2010 | Lee | 455/566 |
| 2010/0306670 A1 | 12/2010 | Quinn et al. | |
| 2010/0328227 A1 | 12/2010 | Matejka et al. | |
| 2011/0115741 A1 | 5/2011 | Lukas et al. | |
| 2011/0163955 A1 | 7/2011 | Nasiri et al. | |
| 2011/0167357 A1 | 7/2011 | Benjamin et al. | |
| 2011/0187651 A1 | 8/2011 | Whitlow et al. | |
| 2011/0193788 A1 | 8/2011 | King et al. | |
| 2011/0197153 A1 | 8/2011 | King et al. | |
| 2011/0221777 A1 | 9/2011 | Ke | |
| 2011/0231796 A1 | 9/2011 | Vigil | |
| 2011/0239110 A1 | 9/2011 | Garrett et al. | |
| 2012/0092268 A1 | 4/2012 | Tsai et al. | |
| 2012/0092269 A1 | 4/2012 | Tsai et al. | |
| 2012/0154293 A1 | 6/2012 | Hinckley et al. | |
| 2012/0154294 A1 | 6/2012 | Hinckley et al. | |
| 2012/0154295 A1 | 6/2012 | Hinckley et al. | |
| 2012/0154296 A1 | 6/2012 | Hinckley et al. | |
| 2012/0158629 A1 | 6/2012 | Hinckley et al. | |
| 2012/0206330 A1 | 8/2012 | Cao et al. | |
| 2012/0260220 A1* | 10/2012 | Griffin | 715/863 |
| 2013/0335333 A1 | 12/2013 | Kukulski et al. | |

OTHER PUBLICATIONS

Song, et al., "WYSIWYF: Exploring and Annotating Volume Data with a Tangible Handheld Device," retrieved at <<http://www.ntu.edu.sg/home/aswbgoh/publication/CHI2011_WYSIWYF.pdf>>, Proceedings of the 2011 Annual Conference on Human Factors in Computing Systems, May 2011, 10 pages.

Ruiz, et al., "User-Defined Motion Gestures for Mobile Interaction," retrieved at <<http://yangl.org/pdf/motiongestures-chi2011.pdf>>, Proceedings of the 2011 Annual Conference on Human factors in Computing Systems, May 2011, 10 pages.

Dachselt, et al., "Throw and Tilt—Seamless Interaction across Devices Using Mobile Phone Gestures," retrieved at <<http://isgwww.cs.uni-magdeburg.de/uise/Forschung/Publikationen/2009-MEIS-Throw-and-Tilt.pdf>>, Proceedings of 34th Graphics Interface Conference, May 2008, 7 pages.

Eslambolchilar, et al., "Tilt-Based Automatic Zooming and Scaling in Mobile Devices—a state-space implementation," retrieved at <<http://www.dcs.gla.ac.uk/~rod/publications/EsIMur04-SDAZ.pdf>>, Proceedings of Mobile HCI2004: 6th International Conference on Human Computer Interaction with Mobile Devices, Springer, 2004, 12 pages.

"International Search Report", Mailed Date: Jul. 31, 2012, Application No. PCT/US2011/065680, Filed Date: Dec. 17, 2011, pp. 13.

Joselli, et al., "gRmobile: A Framework for Touch and Accelerometer Gesture Recognition for Mobile Games", VIII Brazilian Symposium on Digital Games and Entertainment, IEEE, 2009, pp. 141-150.

Wigdor, et al., "Lucid Touch: a See-through Mobile Device," retrieved at <<http://acm.org>>, Proceedings of the 20th Annual ACM Symposium on User Interface Software and Technology, 2007, pp. 269-278.

Döring, et al., "Exploring Gesture-Based Interaction Techniques in Multi-Display Environments with Mobile Phones and a Multi-Touch Table," retrieved at <<http://www.sahami.org/papers/2010/ppd_10.pdf>>, Proceedings of the Workshop on Coupled Display Visual Interfaces, May 25, 2010, pp. 47-54.

"N-act Multi-Touch Gesture Vocabulary Set," retrieved at <<http://www.n-trig.com/Content.aspx?Page=Nact>>, retrieved on Oct. 12, 2011, N-trig, Kfar Saba, Israel, 1 page.

Savov, Vlad, "Samsung Galaxy S II Shows Off Motion-Zoom Option in TouchWiz 4.0 (Video)," retrieved at <<http://www.engadget.com/2011/03/29/samsung-galaxy-s-ii-shows-off-gyro-zoom-option-in-touchwiz-4-0/>>, retrieved on Oct. 13, 2011, Engadget, AOL Tech., AOL, Inc., Vienna, VA, posted Mar. 29, 2011, 3 pages.

"Samsung Exhibit II 4G review: Second time around," retrieved at <<http://www.gsmarena.com/samsung_exhibit_2_4g-review-685p5.php>>, GSMArena.com, Dec. 1, 2011, p. 5 of online article, 3 pages.

(56) References Cited

OTHER PUBLICATIONS

Hinckley, et al., U.S. Appl. No. 12/970,943, filed Dec. 17, 2010, entitled "Using Movement of a Computing Device to Enhance Interpretation of Input Events Produced When Interacting With the Computing Device," 68 pages.
Hinckley, et al., U.S. Appl. No. 12/970,945, filed Dec. 17, 2010, entitled "Detecting and Responding to Unintentional Contact With a Computing Device," 47 pages.
Hinckley, et al., U.S. Appl. No. 12/970,949, filed Dec. 17, 2010, entitled "Cooperative Use of Plural Input Mechanisms to Convey Gestures," 46 pages.
Hinckley, et al., U.S. Appl. No. 12/970,939, filed Dec. 17, 2010, entitled "Detecting Gestures Involving Intentional Movement of a Computing Device," 68 pages.
Hinckley, et al., U.S. Appl. No. 12/970,955, filed Dec. 17, 2010, entitled "Supplementing a Touch Input Mechanism With Fingerprint Detection," 40 pages.
Hinckley, et al., U.S. Appl. No. 13/327,794, filed Dec. 16, 2011, entitled "Gesture Combining Multi-Touch and Movement," 53 pages.
Ramos, et al., "Tumble! Splat! Helping Users Access and Manipulate Occluded Content in 2D Drawings," retrieved at <<http://research.microsoft.com/en-us/um/people/kenh/All-Published-Papers/Tumble-Splat-AVI-2006.pdf>>, Proceedings of the Working Conference on Advanced Visual Interfaces, 2006, pp. 428-435.
"Using Windows Flip 3D," retrieved at <<http://windows.microsoft.com/en-US/windows-vista/Using-Windows-Flip-3D>>, Microsoft Corporation, Redmond, WA, 1 page.
Aliakseyeu, D., A. Lucero, S. Subramanian, Interacting with piles of artifacts on digital tables, Digital Creativity, Jul. 2007, pp. 161-174, vol. 18, No. 3.
Balakrishnan, et al., "The Rockin'Mouse: Integral 3D Manipulation on a Plane", In Proceedings of the ACM SIGCHI Conference on Human Factors in Computing Systems, Mar. 22, 1997, 8 pages.
Bao, et al., "Effect of Tilt Angle of Tablet on Pen-based Input Operation Based on Fitts' Law", Proceedings of the 2010 IEEE International Conference on Information and Automation, Jun. 2010, pp. 99-104.
Bi, et al., "An Exploration of Pen Rolling for Pen-Based Interaction", In Proceedings of the 21st Annual ACM Symposium on User Interface Software and Technology, Oct. 19, 2008, 10 pages.
Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 10 pages.
Fitzmaurice, et al., "Tracking Menus", In Proceedings of the 16th Annual ACM Symposium on User Interface Software and Technology, Nov. 2, 2003, 10 pages.
Frisch, et al., "Investigating Multi-Touch and Pen Gestures for Diagram Editing on Interactive Surfaces", In ACM International Conference on Interactive Tabletops and Surfaces, Nov. 23, 2009, 8 pages.
Grossman, et al., "Hover Widgets: Using the Tracking State to Extend the Capabilities of Pen-Operated Devices", In Proceedings of the SIGCHI Conference on Human Factors in Computing Systems, Apr. 22, 2006, 10 pages.
Hinckley, et al., "Pen + Touch = New Tools", In Proceedings of the 23nd Annual ACM Symposium on User Interface Software and Technology, Oct. 3, 2010, 10 pages.
Hinckley, Ken, "Synchronous Gestures for Multiple Persons and Computers", In Proceedings of the 16th Annual ACM Symposium on User Interface Software and Technology, Nov. 2, 2003, 10 pages.
Hinckley, et al., "Touch-Sensing Input Devices", In Proceedings of the SIGCHI Conference on Human Factors in Computing Systems, May 15, 1999, 8 pages.
Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.
Izadi, et al., "C-Slate: A Multi-Touch and Object Recognition System for Remote Collaboration using Horizontal Surfaces", Second Annual IEEE International Workshop on Horizontal Interactive Human-Computer System, Oct. 2007, pp. 3-10.
Kendrick, "ChromeTouch: Free Extension for Touch Tables", GigaOM, May 6, 2010, 9 pages.
Kurtenbach, et al., "Issues in Combining Marking and Direct Manipulation Techniques", In Proceedings of the 4th Annual ACM Symposium on User Interface Software and Technology, Nov. 11, 1991, 8 pages.
Lester, et al., ""Are You With Me?"—Using Accelerometers to Determine if Two Devices are Carried by the Same Person", In Proceedings of Second International Conference on Pervasive Computing, Apr. 21, 2004, 18 pages.
Li, et al., "Experimental Analysis of Mode Switching Techniques in Pen-Based User Interfaces", In Proceedings of the SIGCHI Conference on Human Factors in Computing Systems, Apr. 2, 2005, 10 pages.
Mohamed, et al., "Disoriented Pen-Gestures for Identifying Users Around the Tabletop Without Cameras and Motion Sensors", Proceedings of the First IEEE International Workshop on Horizontal Interactive Human-Computer Systems (Tabletop '06), Jan. 2006, 8 pages.
Mulroy, "N-Trig Pushes Pen and Multitouch Input", PC World, retrieved on Jan. 27, 2011 at <<http://www.pcworld.com/article/196723/ntrig_pushes_pen_and_multitouch_input.html>>, May 19, 2010, 3 pages.
Ramos, et al., "Pressure Widgets", In Proceedings of the SIGCHI Conference on Human Factors in Computing Systems, vol. 6, Issue 1, Apr. 24, 2004, 8 pages.
Sachs, et al., "3-Draw: A Tool for Designing 3D Shapes", In Journal of IEEE Computer Graphics and Applications, vol. 11, Issue 6, Nov. 1991, 9 pages.
Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.
Subramanian, et al., "Multi-layer interaction for digital tables," In Proc. of the 19th Annual ACM Symposium on User Interface Software and Technology, Oct. 15, 2006, pp. 269-272.
Suzuki, et al., "Stylus Enhancement to Enrich Interaction with Computers", In Proceedings of the 12th International Conference on Human-Computer Interaction: Interaction Platforms and Techniques, Jul. 22, 2007, 10 pages.
Thurott, Paul, "Windows XP Tablet PC Edition reviewed", Paul Thurrott's Supersite for Windows, Jun. 25, 2002, 7 pages.
Tian, et al., "The Tilt Cursor: Enhancing Stimulus-Response Compatibility by Providing 3D Orientation Cue of Pen", In Proceedings of the SIGCHI Conference on Human Factors in Computing Systems, Apr. 28, 2007, 4 pages.
Tian, et al., "Tilt Menu: Using the 3D Orientation Information of Pen Devices to Extend the Selection Capability of Pen-based User Interfaces", In Proceedings of the SIGCHI Conference on Human Factors in Computing Systems, Apr. 5, 2008, 10 pages.
"TouchPaint.java", The Android Open Source Project, 2007.
Verplaetse, C., "Inertial Proprioceptive Devices: Self-Motion-Sensing Toys and Tools", In IBM Systems Journal, vol. 35, Issue 3-4, Apr. 23, 2013, 12 pages.
Walker, Geoff, "Palm rejection on resistive touchscreens", Veritas et Visus, Nov. 2005, pp. 31-33.
Wilson, et al., "XWand: UI for Intelligent Spaces", In Proceedings of the SIGCHI Conference on Human Factors in Computing Systems, Apr. 5, 2003, 8 pages.
Wu, et al., "Gesture Registration, Relaxation, and Reuse for Multi-Point Direct-Touch Surfaces", In Proceedings of the First IEEE International Workshop on Horizontal Interactive Human-Computer Systems, Jan. 5, 2006, 8 pages.
Yee, Ka-Ping, "Two-Handed Interaction on a Tablet Display", In Proceedings of Extended Abstracts on Human Factors in Computing Systems, Apr. 24, 2004, 4 pages.
Zelenik, et al., "Hands-On Math: A Page-Based Multi-Touch and Pen Desktop for Technical Work and Problem Solving", In Proceedings

(56) References Cited

OTHER PUBLICATIONS of the 23nd Annual Symposium on User Interface Software and Technology, Oct. 3, 2010, 10 pages.
Figueroa-Gibson, G., U.S. Office Action, U.S. Appl. No. 12/970,943, Jun. 10, 2013.
Ilya Traktovenko, U.S. Office Action, U.S. Appl. No. 12/970,945, Apr. 22, 2013.
Figueroa-Gibson, G., U.S. Office Action, U.S. Appl. No. 12/970,939, Jun. 5, 2013.
Figueroa-Gibson, G., U.S. Office Action, U.S. Appl. No. 12/970,939, Aug. 22, 2013.
Traktovenko, Ilya, U.S. Notice of Allowance, U.S. Appl. No. 12/970,945, Jul. 10, 2013.
Figueroa-Gibson, G., U.S. Office Action, U.S. Appl. No. 12/970,949, Jun. 21, 2013.
Zhou, Hong, U.S. Office Action, U.S. Appl. No. 13/026,058, Aug. 29, 2013.
Treitler, D., U.S. Office Action, U.S. Appl. No. 13/327,794, Aug. 16, 2013.
Figueroa-Gibson, G., U.S. Office Action, U.S. Appl. No. 12/970,943, Nov. 6, 2013.
Traktovenko, Ilya, U.S. Notice of Allowance, U.S. Appl. No. 12/970,945, Oct. 16, 2013.
"International Search Report", Mailed Date: May 13, 2013, Application No. PCT/US2013/024551, Filed Date: Feb. 3, 2013, pp. 11.
Hinckley et al., "Sensor synaesthesia: touch in Motion, and Motion in Touch.", retrieved at <<http://research.microsoft.com/en-us/um/people/kenh/all-published-papers/sensor-synaesthesia-chi-2011.pdf>>Proceedings of the SIGCHI Conference on Human Factors in Computing Systems, May 7, 2011, pp. 10.
Bartlett, Joel F., "Rock 'n' Scroll Is Here to Stay," accessed at <<http://www.hpl.hp.com/techreports/Compaq-DEC/WRL-2000-3.pdf>>, Western Research Laboratory, Palo Alto, California, May 2000, 9 pages.
Buxton, William, "Lexical and Pragmatic Considerations of Input Structure," retrieved at <<http://acm.org>>, ACM SIGGRAPH Computer Graphics, vol. 17, Issue 1, Jan. 1983, pp. 31-37.
Buxton, William, "Chunking and Phrasing and the Design of Human-Computer Dialogues," retrieved at <<http://www.billbuxton.com/chunking.pdf>>, Proceedings of the IFIP World Computer Congress, 1986, 9 pages.
Buxton, William, "A Three-State Model of Graphical Input," retrieved at <<http://www.billbuxton.com/3state.html>>, in D. Diaper, et al. (Eds), Human-Computer Interaction—Interact '90, Amsterdam: Elsevier Science Publishers B.V. (North-Holland), 1990, 11 pages.
Card, et al., "The Design Space of Input Devices," retrieved at <<http://acm.org>>, CHI '90 Proceedings of the SIGCHI Conference on Human factors in Computing Systems, 1990, pp. 117-124.
Chen, et al., "Navigation Techniques for Dual-Display E-Book Readers," retrieved at <<http://acm.org>>, CHI '08 Proceeding of the Twenty-Sixth Annual SIGCHI Conference on Human Factors in Computing Systems, 2008, pp. 1779-1788.
Cho, et al., "Multi-Context Photo Browsing on Mobile Devices Based on Tilt Dynamics," retrieved at <<http://acm.org>>, MobileHCI '07 Proceedings of the 9th International Conference on Human Computer Interaction with Mobile Devices and Services, 2007, pp. 190-197.
Chun, et al., "Virtual Shelves: Interactions with Orientation-Aware Devices," retrieved at <<http://acm.org>>, UIST'09, 2009, pp. 125-128.
Cohen, et al., "Synergistic Use of Direct Manipulation and Natural Language," retrieved at <<http://acm.org>>, CHI '89 Proceedings of the SIGCHI Conference on Human Factors in Computing Systems, 1989, pp. 227-233.
Hinckley, et al., "Foreground and Background Interaction with Sensor-Enhanced Mobile Devices," retrieved at <<http://research.microsoft.com/en-us/um/people/kenh/papers/tochisensing.pdf>>, ACM Transactions on Computer-Human Interaction, vol. 12, No. 1, Mar. 2005, 22 pages.

Essl, et al., "Use the Force (or something)—Pressure and Pressure-Like Input for Mobile Music Performance," retrieved at <<http://www.deutsche-telekom-laboratories.de/~rohs/papers/Essl-ForceMusic.pdf>>, NIME 2010 Conference on New Interfaces for Musical Expression, Jun. 2010, 4 pages.
Harrison, et al., "Squeeze Me, Hold Me, Tilt Me! An Exploration of Manipulative User Interfaces," retrieved at <<http://acm.org>>, CHI '98 Proceedings of the SIGCHI Conference on Human Factors in Computing Systems, 1998, pp. 17-24.
Harrison, et al., "Scratch Input: Creating Large, Inexpensive, Unpowered and Mobile Finger Input Surfaces," retrieved at <<http://acm.org>>, UIST '08 Proceedings of the 21st Annual ACM Symposium on User interface Software and Technology, 2008, pp. 205-208.
Harrison, et al., "Skinput: Appropriating the Body as an Input Surface," retrieved at <<http://acm.org>>, CHI '10 Proceedings of the 28th International Conference on Human Factors in Computing Systems, Apr. 2010, pp. 453-462.
Herot, et al., "One-Point Touch Input of Vector Information from Computer Displays," retrieved at <<http://acm.org>>, SIGGRAPH '78 Proceedings of the 5th Annual Conference on Computer Graphics and Interactive Techniques, 12(3), 1978, pp. 210-216.
Hinckley, et al., "Design and Analysis of Delimiters for Selection-Action Pen Gesture Phrases in Scriboli," retrieved at <<http://acm.org>>, CHI '05 Proceedings of the SIGCHI Conference on Human Factors in Computing Systems, 2005, pp. 451-460.
Hinckley, et al., "Sensing Techniques for Mobile Interaction," retrieved at <<http://acm.org>>, UIST'00 Proceedings of the 13th Annual ACM Symposium on User Interface Software and Technology, 2000, pp. 91-100.
Hinckley, et al., "Manual Deskterity: An Exploration of Simultaneous Pen + Touch Direct Input," retrieved at <<http://acm.org>>, CHI EA '10 Proceedings of the 28th of the International Conference, Extended Abstracts on Human Factors in Computing Systems, Apr. 2010, pp. 2793-2802.
Hudson, et al., "Whack Gestures: Inexact and Inattentive Interaction with Mobile Devices," retrieved at <<http://acm.org>>, TEI '10 Proceedings of the fourth International Conference on Tangible, Embedded, and Embodied Interaction, Jan. 2010, pp. 109-112.
Iwasaki, et al., "Expressive Typing: A New Way to Sense Typing Pressure and Its Applications," retrieved at <<http://acm.org>>, CHI '09 Proceedings of the 27th International Conference Extended Abstracts on Human Factors in Computing Systems, Apr. 2009, pp. 4369-4374.
Joshi, et al., "Image Deblurring Using Inertial Measurement Sensors," retrieved at <<http://acm.org>>, ACM Transactions on Graphics, vol. 29, No. 4, Article 30, Jul. 2010, 9 pages.
Kim, et al., "Hand Grip Pattern Recognition for Mobile User Interfaces," retrieved at <<http://www.aaai.org/Papers/IAAI/2006/IAAI06-013.pdf>>, IAAI'06 Proceedings of the 18th Conference on Innovative Applications of Artificial Intelligence, vol. 2, 2006, pp. 1789-1794.
Kratz, et al., "Unravelling Seams: Improving Mobile Gesture Recognition with Visual Feedback Techniques," retrieved at <<http://acm.org>>, CHI '09 Proceedings of the 27th International Conference on Human Factors in Computing Systems, 2009, pp. 937-940.
Liao, et al., "PACER: Fine-grained Interactive Paper via Camera-touch Hybrid Gestures on a Cell Phone," retrieved at <<http://acm.org>>, CHI '10 Proceedings of the 28th International Conference on Human Factors in Computing Systems, Apr. 2010, pp. 2441-2450.
Oviatt, et al., "Toward a Theory of Organized Multimodal Integration Patterns during Human-Computer Interaction," retrieved at <<http://acm.org>>, ICMI '03 Proceedings of the 5th International Conference on Multimodal Interfaces, 2003, pp. 44-51.
Partridge, et al., "TiltType: Accelerometer-Supported Text Entry for Very Small Devices," retrieved at <<http://acm.org>>, UIST '02 Proceedings of the 15th Annual ACM Symposium on User Interface Software and Technology, 2002, pp. 201-204.
Rahman, et al., "Tilt Techniques: Investigating the Dexterity of Wrist-based Input," retrieved at <<http://acm.org>>, CHI '09 Proceedings of the 27th international Conference on Human Factors in Computing Systems, 2009, pp. 1943-1952.

(56) References Cited

OTHER PUBLICATIONS

Roudaut, et al., "TimeTilt: Using Sensor-Based Gestures to Travel through Multiple Applications on a Mobile Device," retrieved at <<bencoenrico.free.fr/ENST/Home_files/roudaut_interact-Time09.pdf>>, Interact '09, Proceedings of the 12th IFIP TC 13 International Conference on Human-Computer Interaction: Part I, 2009, 4 pages.

Schmidt, et al., "Advanced Interaction in Context," retrieved at <<http://citeseerx.ist.psu.edu/viewdoc/summary?doi=10.1.1.40.2408>>, HUC '99, Proceedings of the 1st International Symposium on Handheld and Ubiquitous Computing, 1999, 13 pages.

Schwarz, et al., "A Framework for Robust and Flexible Handling of Inputs with Uncertainty," retrieved at <<http://acm.org>>, UIST '10, Proceedings of the 23nd Annual ACM Symposium on User Interface Software and Technology, Oct. 2010, pp. 47-56.

Schwesig, et al., "Gummi: A Bendable Computer," retrieved at <<http://acm.org>>, CHI '04, Proceedings of the SIGCHI Conference on Human Factors in Computing Systems, 2004, pp. 263-270.

Sellen, et al., "The Prevention of Mode Errors through Sensory Feedback," retrieved at <<http://acm.org>>, Journal of Human-Computer Interaction, vol. 7, Issue 2, Jun. 1992, pp. 141-164.

Taylor, et al., "Graspables: Grasp-Recognition as a User Interface," retrieved at <<http://acm.org>>, CHI '09, Proceedings of the 27th International Conference on Human factors in Computing Systems, Apr. 2009, pp. 917-925.

Wigdor, et al., "TiltText:Using Tilt for Text Input to Mobile Phones," retrieved at <<http://acm.org>>, UIST '03, Proceedings of the 16th Annual ACM Symposium on User Interface Software and Technology, 2003, pp. 81-90.

Williamson, et al., "Shoogle: Excitatory Multimodal Interaction on Mobile Devices," retrieved at <<http://acm.org>>, CHI '07, Proceedings of the SIGCHI Conference on Human factors in Computing Systems, 2007, pp. 121-124.

Hassan, et al., "Chucking: A One-Handed Document Sharing Technique," T. Gross et al. (Eds.): Interact 2009, Part II, LNCS 5727, 2009, pp. 264-278.

Rekimoto, Jen, "Tilting Operations for small Screen Interfaces," UIST '96, Proceedings of the 9th Annual ACM Symposium on User Interface Software and Technology, 1996, pp. 167-168.

Hinckley, et al., "Direct Display Interaction via Simultaneous Pen + Multi-touch Input," retrieved at <<http://lily.billbuxton.com/SID10%2038-2.pdf>>, Society for Information Display (SID) Symposium Digest of Technical Papers, vol. 41, No. 1, May 2010, pp. 537-540.

"DuoSense Pen, Touch & Multi-Touch Digitizer," retrieved at <<http://www.n-trig.com/Data/Uploads/Misc/DuoSense_Brochure_FINAL.pdf>>, N-trig Ltd., Kfar Saba, Israel, 2008, 4 pages.

"PenLab: Itronix GoBook Duo-Touch," retrieved at <<http://pencomputing.com/frames/itronix_duotouch.html>>, retrieved on Jan. 31, 2012, Pen Computing Magazine, 3 pages.

Babyak, Richard, "Controls & Sensors: Touch Tones", retrieved at <<http://www.appliancedesign.com/Articles/Controls_and_Displays/BNP_GUID_9-5-2006_A_10000000000000129366>>, Appliance Design, Jun. 30, 2007, 5 pages.

Bjørneseth, et al., "Dynamic Positioning Systems—Usability and Interaction Styles," retrieved at <<http://www.ceng.metu.edu.tr/~tcan/se705_s0809/Schedule/assignment3.pdf>>, Proceedings of the 5th Nordic Conference on Human-Computer Interaction: Building Bridges, Oct. 2008, 10 pages.

Edge, et al., "Bimanual Tangible Interaction with Mobile Phones," retrieved at <<http://research.microsoft.com/en-us/people/daedge/edgeteibimanual2009.pdf>>, Proceedings of the 3rd International Conference on Tangible and Embedded Interaction, Feb. 2009, pp. 131-136.

Malacria, et al., "Clutch-Free Panning and Integrated Pan-Zoom Control on Touch-Sensitive Surfaces: The CycloStar Approach," retrieved at <<http://www.malacria.fr/data/doc/pdf/cyclostar.pdf>>, Proceedings of the 28th International Conference on Human Factors in Computing Systems, Apr. 2010, 10 pages.

Ashbrook, et al., "MAGIC: A Motion Gesture Design Tool," retrieved at <<http://research.nokia.com/files/2010-Ashbrook-CHI10-MAGIC.pdf>>, Proceedings of the 28th International Conference on Human Factors in Computing Systems, Apr. 2010, 10 pages.

"International Search Report", Mailed Date—Jul. 31, 2012 , Application No. PCT/US2011/065595, Filed Date—Dec. 16, 2011, pp. 13.

Figueroa-Gibson, Gloryvid, U.S. Final Office Action, U.S. Appl. No. 12/970,949, Nov. 29, 2013, pp. 1-29.

Figueroa-Gibson, Gloryvid, U.S. Office Action, U.S. Appl. No. 12/970,943, Mar. 13, 2014, pp. 1-25.

Figueroa-Gibson, Gloryvid, U.S. Office Action, U.S. Appl. No. 12/970,939, Dec. 19, 2013, pp. 1-28.

Zhou, Hong, U.S. Final Office Action, U.S. Appl. No. 13/026,058, Feb. 26, 2014, pp. 1-14.

Treitler, Damon , U.S. Final Office Action, U.S. Appl. No. 13/327,794, Dec. 19, 2013, pp. 1-16.

Balakrishnan, et al., Digital tape drawing, Proceedings of the 12th Annual ACM Symposium on User Interface Software and Technology, ACM Symposium on User Interface Software and Technology, UIST '99, Nov. 7-10, 1999, pp. 161-169, Asheville, USA.

Brandl, et al., "Occlusion-aware menu design for digital tabletops", Proc. of the 27th Int'l Conf. on Human Factors in Computing Systems, CHI 2009, Extended Abstracts, Apr. 4-9, 2009, pp. 3223-3228, Boston, MA, USA.

Buxton, W., "Integrating the Periphery and Context: A New Model of Telematics Proceedings of Graphics Interface", 1995, pp. 239-246.

Chu, et al., "Detail-preserving paint modeling for 3D brushes", Proc. of the 8th Int'l Symposium on Non-Photorealistic Animation and Rendering 2010, NPAR 2010, Jun. 7-10, 2010, pp. 27-34, Annecy, France.

Fitzmaurice, et al., "An Exploration into Supporting Artwork Orientation in the User Interface", Proc. of the CHI '99 Conf. on Human Factors in Computing Sys's: The CHI is the Limit, Pittsburgh, CHI 1999, May 15-20, 1999, pp. 167-174.

Guiard, et al., "Writing Postures in Left-Handers: Inverters are Hand-Crossers", Neuropsychologia, Mar. 1984, pp. 535-538, vol. 22, No. 4.

Hinckley, et al., "Codex: A dual screen tablet computer", Proc. of the 27th Int'l Conf. on Human Factors in Computing Sys's, CHI 2009, Apr. 4-9, 2009, pp. 1933-1942, Boston, MA, USA.

Kurtenbach, et al., "The design of a GUI paradigm based on tablets, two-hands, and transparency", Proceedings of the ACM SIGCHI Conference on Human factors in computing systems, CHI 1997, Mar. 1997, pp. 35-42.

Lee, et al., "HandSCAPE: A vectorizing tape measure for on-site measuring applications", Proceedings of the CHI 2000 Conference on Human factors in computing systems, CHI 2000, Apr. 1-6, 2000, pp. 137-144, The Hague, The Netherlands.

Luff, et al., Mobility in Collaboration, Proceedings of the ACM 1998 Conference on Computer Supported Cooperative Work, CSCW 1998, Nov. 14-18, 1998, pp. 305-314, Seattle, WA, USA.

Mahony, et al., Nonlinear Complementary Filters on the Special Orthogonal Group, IEEE Trans. Automat. Contr., 2008, pp. 1203-1218, vol. 53, No. 5.

Mason, et al., "Grip Forces When Passing an Object to a Partner", Exp. Brain Res., May 2005, vol. 163, No. 2, pp. 173-187.

Premerlani, et al., Direction Cosine Matrix IMU: Theory, retrieved from gentlenav.googlecode.com/files/DCMDraft2.pdf, May 2009, pp. 1-30.

Siio, et al., "Mobile Interaction Using Paperweight Metaphor", Proc. of the 19th Annual ACM Symposium on User Interface Software and Technology, UIST '06, Oct. 2006, pp. 111-114, Montreux, Switzerland.

"Wimmer, et al., HandSense: Discriminating Different Ways of Grasping and Holding a Tangible User Interface, Proceedings of the 3rd International Conference on Tangible and Embedded Interaction, TEI '09, Feb. 2009, pp. 359-362, Cambridge, UK."

Traktovenko, Ilya, U.S. Office Action, U.S. Appl. No. 13/530,015, Jul. 18, 2014, pp. 1-26.

Figueroa-Gibson, Gloryvid, U.S. Office Action, U.S. Appl. No. 12/970,949, Mar. 13, 2014, pp. 1-29.

Figueroa-Gibson, Gloryvid, U.S. Final Office Action, U.S. Appl. No. 12/970,949, Aug. 15, 2014, pp. 1-21.

(56) References Cited

OTHER PUBLICATIONS

Figueroa-Gibson, Gloryvid, U.S. Final Office Action, U.S. Appl. No. 12/970,939, May 30, 2014, pp. 1-32.
Figueroa-Gibson, Gloryvid, U.S. Office Action, U.S. Appl. No. 12/970,939, Oct. 2, 2014, pp. 1-40.
Figueroa-Gibson, Gloryvid, U.S. Office Action, U.S. Appl. No. 12/970,943, Sep. 17, 2014, pp. 1-20.
Zhou, Hong, Notice of Allowance, U.S. Appl. No. 13/026,058, Jul. 17, 2014, pp. 1-5.
Treitler, Damon, U.S. Office Action, U.S. Appl. No. 13/327,794, Jul. 17, 2014, pp. 1-13.
"First Office Action and Search Report Received in Chinese Patent Application No. 201110427737.8", Mailed Date: Mar. 28, 2014, Filed Date: Feb. 7, 2012, 19 Pages.

* cited by examiner

US 8,902,181 B2

MULTI-TOUCH-MOVEMENT GESTURES FOR TABLET COMPUTING DEVICES

BACKGROUND

A tablet computing device commonly allows users to make various gestures by touching the surface of the device's touchscreen in a prescribed manner. For example, a user can instruct the computing device to execute a panning operation by touching the surface of the touchscreen with a single finger and then dragging that finger across the surface of the touchscreen surface. In another case, a user can instruct the computing device to perform a zooming operation by touching the surface of the touchscreen with two fingers and then moving the fingers closer together or farther apart.

To provide a robust user interface, a developer may wish to expand the number of gestures that the computing device is able to recognize. However, a developer may find that the design space of available gestures is limited. Hence, the developer may find it difficult to formulate a gesture that is suitably distinct from existing gestures. The developer may create an idiosyncratic and complex gesture to distinguish over existing gestures. But an end user may have trouble remembering and performing such a gesture.

SUMMARY

Functionality is described herein for detecting and responding to gestures performed by a user using a computing device, such as, but not limited to, a tablet computing device. In one implementation, the functionality operates by receiving touch input information from at least one touch input mechanism in response to a user touching the computing device. The functionality also receives movement input information from at least one movement input mechanism in response to movement of the computing device. The functionality then determines whether the touch input information and the movement input information indicate that a user has performed or is performing a multi-touch-movement (MTM) gesture. In some cases, the user performs an MTM gesture by grasping the computing device with two hands and establishing contact with one or more surfaces of the computing device with those hands. The user then moves the computing device in a prescribed path, and/or to achieve a prescribed static posture. For example, the MTM gesture can be defined with respect to any type of tilting, flipping, pivoting, twisting, sliding, shaking, vibrating, and/or tapping motion.

The functionality can invoke any behavior in response to determining that the user has performed (or is performing) an MTM gesture. More specifically, in one case, the functionality performs the behavior after a discrete gesture has been performed. In another case, the functionality performs the behavior over the course of the gesture, once it is determined that the gesture is being performed. In one case, the functionality can modify a view in response to determining that the user has performed an MTM gesture. In another case, the functionality can invoke any function in response to determining that the user has performed an MTM gesture. In another case, the functionality can perform any type of control operation, e.g., by using the gesture to specify a parameter, a path, a range of values, etc. The control operation may affect any designated item in any manner. Still other types of behavior can be associated with gestures.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for interpreting gestures made by a user in the course of interacting with a computing device, including multi-touch-movement gestures which involve touching and moving the computing device. Section B describes illustrative methods which explain the operation of the functionality of Section A. Section C describes illustrative computing functionality that can be used to implement any aspect of the features described in Sections A and B.

This application is related to commonly-assigned patent application Ser. No. 12/970,939, entitled, "Detecting Gestures Involving Intentional Movement of a Computing Device," naming the inventors of Kenneth Hinckley, et al., filed on Dec. 17, 2010.

Figure 20:
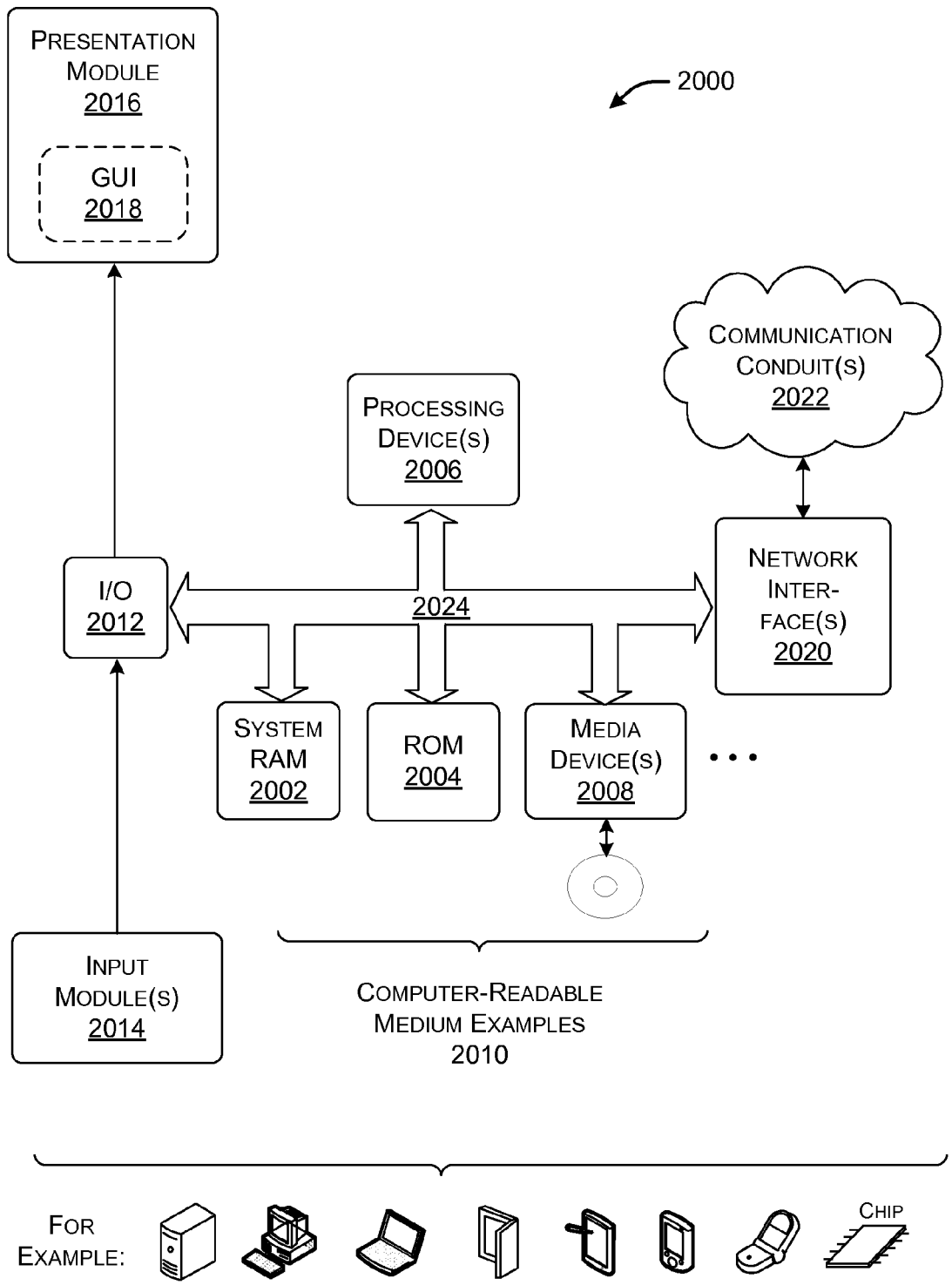
FIG. 20 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 20, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
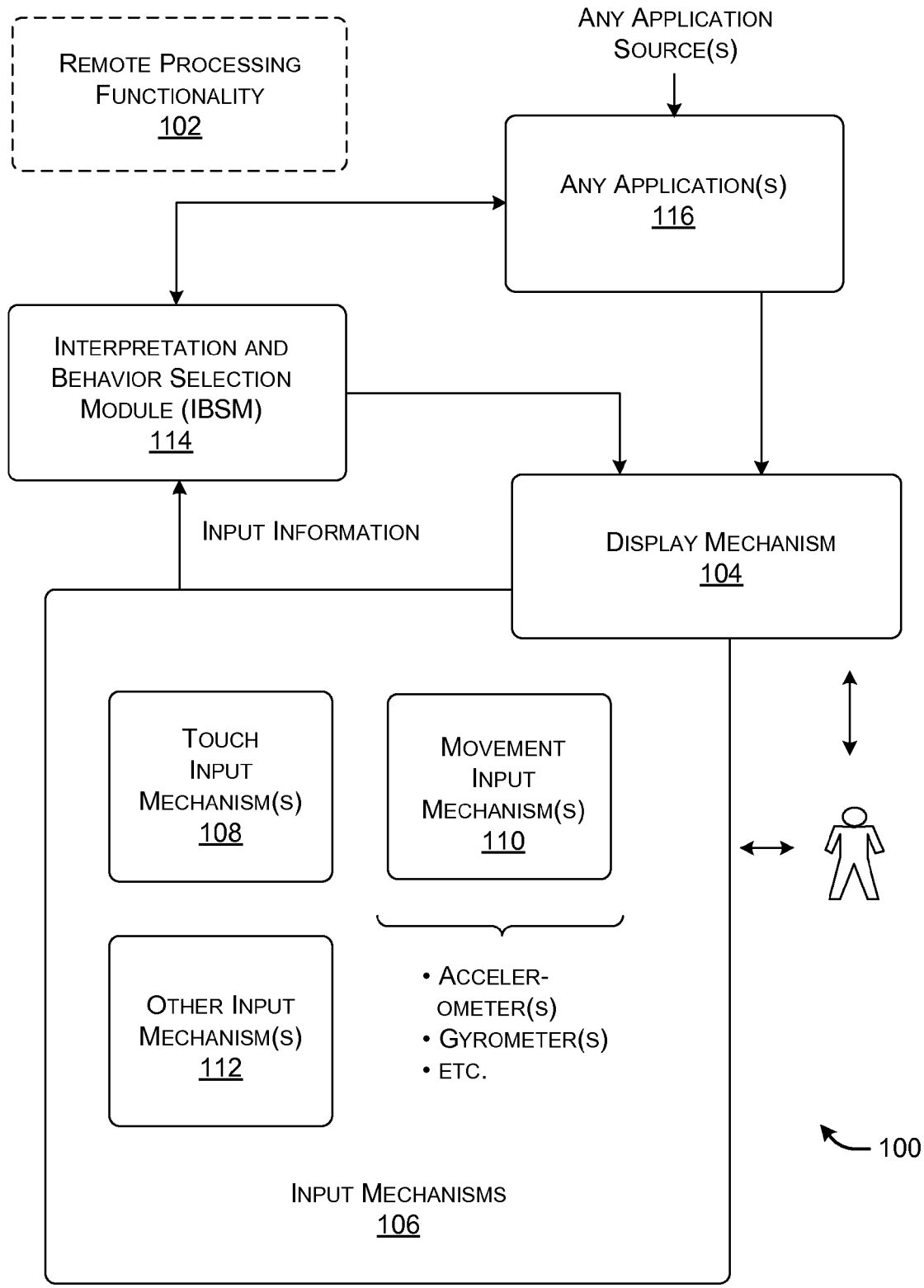
FIG. 1 shows an illustrative computing device that includes functionality for interpreting touch input information in the context of movement input information.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Computing Device and its Environment of Use A.1. Overview FIG. 1 shows an illustrative portable tablet computing device 100 on which a user can perform gestures. The term tablet computing device is used broadly herein to refer to any computing device having one or more generally flat touch-sensitive surfaces for receiving input from a user. In some examples, the computing device 100 has a rigid and/or flexible and/or adjustable interaction surface that ranges from 5 inches to 12 inches (along its longest side), with an aspect ratio typically ranging from approximately 4:3 to 16:9, although the principles described herein are also applicable to computing devices having smaller or larger interaction surfaces, and/or other aspect ratios. The interaction surface can also have any shape (for example, the interaction surface need not be rectangular). Further, in some cases, the computing device 100 can also embody one or more features of other form factors. For example, in some cases, the computing device 100 may also be classified as a game device, a smartphone device, an electronic book reader device, various types of netbook computing devices (with and without physical keyboards), various types of laptop computing devices, multi-screen "booklet" devices, and so on.

In some scenarios, the computing device 100 is large enough so that the user will most often grasp the computing device 100 with both hands (that is, when holding the computing device 100 aloft). The user may then interact with the computing device 100 using the thumbs (and/or other fingers) of the grasping hands. However, in some scenarios, a user may also grasp the computing device 100 with one hand. The user may then interact with computing device 100 using his or her free hand and/or the grasping hand.

More specifically, to simplify explanation, many of the examples presented herein indicate that the user may establish contact with the computing device 100 using one or more fingers of one of more hands. As used herein, a thumb is considered a particular type of finger. More generally, the principles described herein can be applied to the case in which the user establishes contact with the computing device 100 using any hand parts (and/or other body parts), and/or any implements that are manipulated by the user (such as an active or passive stylus).

In some implementations, all of the gesture-recognition functionality described herein is implemented on the computing device 100. Alternatively, at least some aspects of the gesture-recognition functionality can be implemented by remote processing functionality 102. The remote processing functionality 102 may correspond to one or more server computers and associated data stores, provided at a single site or distributed over plural sites. The computing device 100 can interact with the remote processing functionality 102 via one or more networks (not shown), such as the Internet. However, to simplify and facilitate explanation, it will henceforth be assumed that the computing device 100 performs all aspects of the gesture-recognition functionality.

The computing device 100 includes a display mechanism 104 and various input mechanisms 106. The display mechanism 104 provides a visual rendering of digital information on a display surface of the computing device 100. More specifically, in one case, the computing device 100 includes a single display surface. In another case, the computing device 100 includes plural display surfaces, e.g., disposed on different parts of the computing device 100. The display mechanism 104 can be implemented by any type of display, such as a liquid crystal display, etc. Although not shown, the computing device 100 can also include other types of output mechanisms, such as an audio output mechanism, a haptic (e.g., vibratory) output mechanism, etc.

The input mechanisms 106 provide input information in response to input events. In one case, the input mechanisms 106 provide input information in response to input actions performed by a user. A single instance of input information can have any composition and duration, and can be generated in response to one or more input events.

The input mechanisms 106 can include at least one touch input mechanism 108 which provides touch input information when the user makes contact with at least one surface of the computing device 100. For example, in one case, the touch input mechanism 108 can correspond to a touchscreen interface mechanism which provides touch input information when it detects that a user has touched a touch-sensitive display surface. This type of touch input mechanism can be implemented using any technology, such as resistive touch screen technology, capacitive touch screen technology, acoustic touch screen technology, bi-directional touch screen technology, optical (e.g., infrared beam or in-plane camera) technology, and so on. In bi-directional touch screen technology, a display mechanism provides elements devoted to displaying information and elements devoted to receiving information. Thus, a surface of a bi-directional display mechanism is also a capture mechanism.

In the examples presented herein, the user may interact with the touch input mechanism 108 by physically touching a display surface of the computing device 100. However, the touch input mechanism 108 can also be configured to detect when the user has made contact with any other surface of the computing device 100 (which may or may not also provide a display surface), such as the back of the computing device 100, and/or the sides of the computing device 100, and/or any front portions of the computing device 100 which do not provide a display surface (such as a bezel of the computing device 100, if it provides one). In addition, in some cases, a user can be said to make contact with a surface of the computing device 100 when he or she draws close to a surface of the computing device, without actually physically touching the surface. Among other technologies, the bi-directional touch screen technology described above can accomplish the task of detecting when the user moves his or her hand close to a display surface, without actually touching it. A user may intentionally or unintentionally contact a surface of the computing device 100 with any part of his or her hand, such as with any part of one or more fingers, a palm, a knuckle, etc. As stated above, a thumb is considered as one type of finger.

Alternatively, or in addition, the touch input mechanism 108 can correspond to a pen input mechanism whereby a user makes physical or close contact with a surface of the computing device 100 with a stylus or other implement of any type (besides, or in addition to, the user's hands). Accordingly, the term touch input information is also intended to encompass input information that may be produced when a stylus makes contact (or near-contact) with the computing device 100. Further, in some cases, the touch input information may include a combination of input information produced by the tip of the stylus and input information produced by any portion(s) of the hand which deliberately or inadvertently makes contact (or near-contact) with the touch-sensitive surface(s) of the computing device 100. For example, a user may accidently rest or brush a finger, palm, knuckle, etc. against a touch-sensitive surface while making pen strokes using a stylus. However, to facilitate and simplify description, the explanation will henceforth assume that the user interacts with the touch input mechanism 108 by physically touching its surface with fingers of the hands.

FIG. 1 depicts the input mechanisms 106 as partially overlapping the display mechanism 104. This is because at least some of the input mechanisms 106 may be integrated with functionality associated with the display mechanism 104. This is the case, for example, with respect to a touch interface mechanism because the display surface of this device is used to both display information and provide input information.

The input mechanisms 106 also include at least one movement input mechanism 110 for supplying movement input information that describes movement of the computing device 100. That is, the movement input mechanism 110 corresponds to any type of input mechanism that measures the orientation and/or motion of the computing device 100 to supply the movement input information. For instance, the movement input mechanism 110 can be implemented using accelerometers, gyroscopes, magnetometers, vibratory sensors, torque sensors, strain gauges, flex sensors, optical encoder mechanisms, laser speckle tracking mechanisms, mechanical orientation sensors, and so on. Any movement input mechanism 110 can sense movement along any number of spatial axes. For example, the computing device 100 can incorporate an accelerometer and/or a gyroscope that measures movement along three spatial axes.

FIG. 1 also indicates that the input mechanisms 106 can include any other input mechanisms 112. Illustrative other input mechanisms can include one or more image sensing input mechanisms, such as a video capture input mechanism, a depth sensing input mechanism, a stereo image capture mechanism, and so on. Some of the image sensing input mechanisms can also function as movement input mechanisms, insofar as they can be used to determine movement of the computing device 100 relative to the surrounding environment. Other input mechanisms can include a physical keyboard input mechanism, a joystick mechanism, a mouse input mechanism, a voice input mechanism, and so on.

In some cases, the input mechanisms 106 may represent components that are integral parts of the computing device 100. For example, the input mechanisms 106 may represent components that are enclosed in or disposed on a housing associated with the computing device 100. In other cases, at least some of the input mechanisms 106 may represent functionality that is not physically integrated with the other components of the computing device 100. For example, at least some of the input mechanisms 106 can represent components that are coupled to the computing device 100 via a communication conduit of any type (e.g., a cable). For example, one type of touch input mechanism 108 may correspond to a pad-type input mechanism that is separate from (or at least partially separate from) the display mechanism 104. A pad-type input mechanism is also referred to as a tablet, a digitizer, a graphics pad, etc.

In certain cases, the computing device 100 may correspond to a booklet computing device 100 that includes two or more sections. The booklet computing device can include any type of coupling mechanism for coupling the sections together, such as, without limitation, a hinge mechanism. In some cases, each section of the booklet computing device includes its own touch input mechanism. For example, each section of the booklet computing device can include a touchscreen interface mechanism. In addition, or alternatively, each section of the booklet computing device can include its own movement input mechanism, each for sensing the movement of that section (which may be independent, to some extent, from the movement of other sections). However, in other cases, the booklet computing device can include a single touch input mechanism and/or a single movement input mechanism.

In addition, or alternatively, a booklet computing device can include any type of movement input mechanism that senses movement of the sections relative to each other. For example, the booklet computing device can include an angle sensor (e.g., a resistive flex sensor, an optical encoder, etc.) which detects the angle of a first section relative to a second section.

Figure 2:
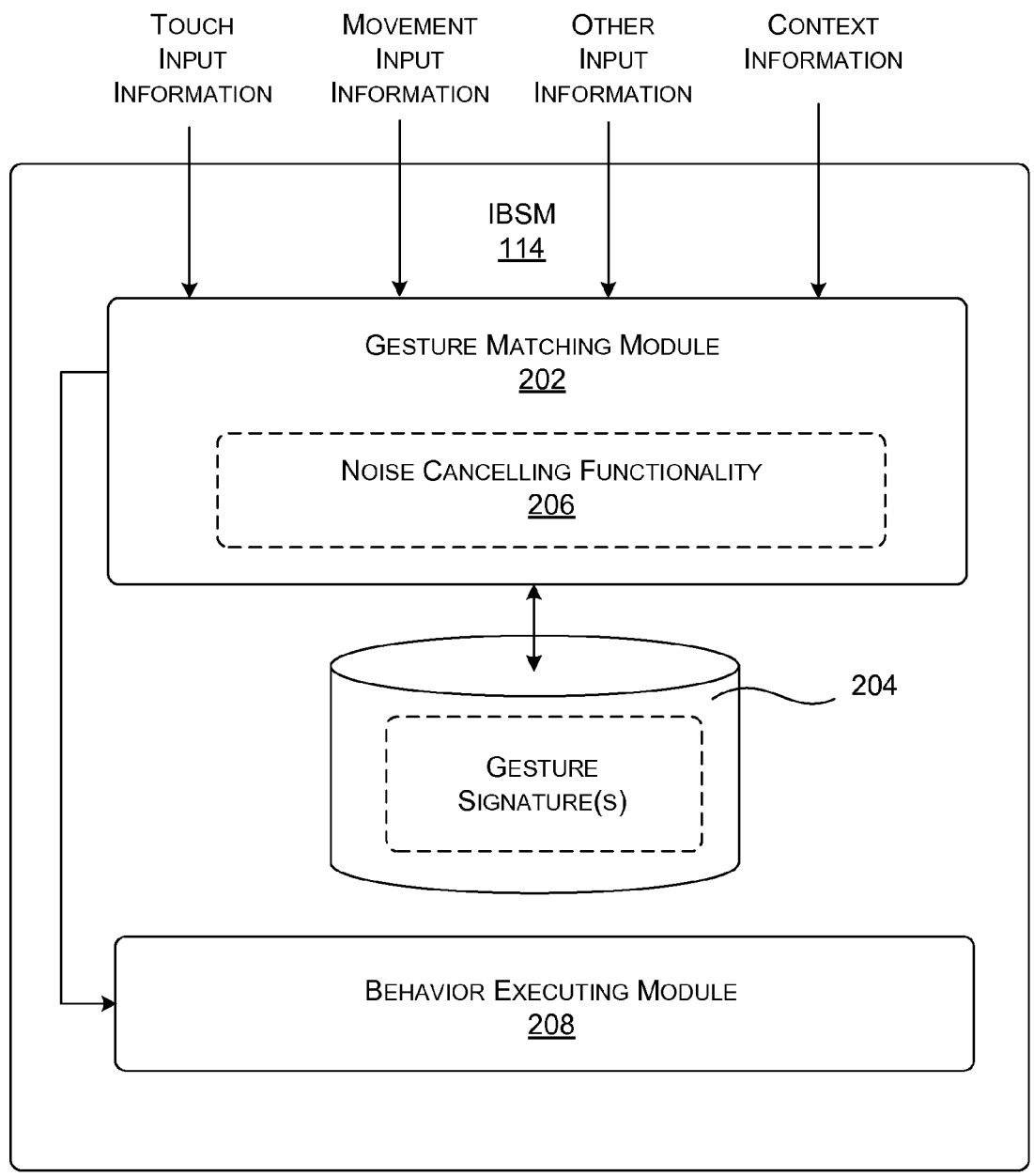
FIG. 2 shows an illustrative interpretation and behavior selection module (IBSM) used in the computing device of FIG. 1.

An interpretation and behavior selection module (IBSM) 114 performs the task of interpreting the input information. In particular, the IBSM 114 receives at least touch input information from the touch input mechanism 108 and movement input information from the touch movement input mechanism 110. Based on these instances of input information, the IBSM 114 determines whether the user has made (or is making) a recognizable gesture. If a gesture is detected, the IBSM executes behavior associated with that gesture. More specifically, in one case, the IBSM 114 performs the behavior after a discrete gesture has been completed. In another case, the IBSM 114 performs the behavior over the course of the gesture, once it is determined that the gesture is being performed. FIG. 2 provides additional details regarding one implementation of the IBSM 114. Section A.3 provides additional details regarding behavior that can be generated in response to detecting that the user has performed (or is performing) a gesture.

Finally, the computing device 100 may run at least one application 116 that performs any high-level and/or low-level function in any application domain. In one case, the application 116 represents functionality that is stored on a local store provided by the computing device 100. For instance, the user may download the application 116 from a remote marketplace system or the like. The user may then run the application 116 using the local computing resources of the computing device 100. Alternatively, or in addition, a remote system can store at least parts of the application 116. In this case, the user can execute the application 116 by instructing the remote system to run it.

In one case, the IBSM 114 represents a separate component with respect to application 116 that both recognizes a gesture and performs whatever behavior is associated with the gesture. In another case, one or more functions attributed to the IBSM 114 can be performed by the application 116. For example, in one implementation, the IBSM 114 can interpret a gesture that has been performed, while the application 116 can select and execute behavior associated with the detected gesture. Accordingly, the concept of the IBSM 114 is to be interpreted liberally herein as encompassing functions that can be performed by any number of components within a particular implementation.

FIG. 2 shows one implementation of the IBSM 114. The IBSM 114 can include a gesture matching module 202 for receiving various instances of input information. The input information can include touch input information from the touch input mechanism 108, movement input information from the movement input mechanism 110, and any other input information from any other input mechanisms 112. The input information can also include context information which indicates a context in which a user is currently using the computing device 100. For example, the context information can identify the application that the user is running at the present time, if any. Alternatively, or in addition, the context information can describe the physical environment in which the user is using the computing device 100, e.g., by providing details regarding any of: ambient light and/or sound levels in the environment; the presence of other proximal computing devices, persons, and/or physical barriers (such as walls and windows) in the environment, etc. Alternatively, or in addition, the context information can identify the user who is currently interacting with the computing device 100, and so on.

In one implementation, the gesture matching module 202 compares the input information with a collection of gesture signatures provided in a data store 204. If the gesture matching module 202 finds a match, it concludes that the user has performed (or is performing) a gesture that is associated with the matching gesture signature.

More specifically, a gesture signature may provide any descriptive information which characterizes the touch input information and/or motion input information that are typically produced when a user makes (or is making) a particular kind of gesture. For example, a gesture signature may indicate that a gesture X is characterized by a pattern of observations A, B, and C. Hence, if the gesture matching module 202 determines that the observations A, B, and C are present in the input information at a particular time, it can conclude that the user has performed (or is currently performing) gesture X.

Any gesture that is defined with respect to a combination of two or more contacts and movement is referred to herein as a multi-touch-movement (MTM) gesture. The gesture signature which characterizes an MTM gesture is referred to as an MTM signature.

More specifically, in some cases, the user can perform an MTM gesture by grasping the computing device 100 with two hands. The user can then use his or her thumbs (and/or other fingers and/or other hand parts) to establish two or more contacts on one or more surfaces of the computing device 100. In other cases, however, the user may establish the two or more contacts using a single hand. The user can then move the computing device 100 in a prescribed manner.

The user may perform the movement in various ways. In some cases, the user performs the movement by moving the computing device 100 over a prescribed path associated with the MTM gesture. Alternatively, or in addition, the user establishes the movement by advancing the computing device 100 to a prescribed orientation. In the latter case, the gesture is associated with a static posture of the computing device 100, independent of the path that is used to establish that static posture. In still other cases, an MTM gesture can be defined by a combination of one or more static poses and dynamic movement of the computing device 100. Section A.2 describes additional features that can be used to define an MTM gesture.

In some cases, the touch input events associated with an MTM gesture (which cause the generation of the touch input information) occur simultaneously with the movement input events (which cause the generation of the movement input information), meaning that the user touches the computing device 100 at the same time that he or she moves it. But in other cases, the touch input events can be temporally interleaved with the movement input events in any manner. For example, a touch input event can precede and/or follow a movement input event. Alternatively, or in addition, a separate touch input event and/or movement input event can precede and/or follow a simultaneous occurrence of a touch input event and a movement input event. However, to facilitate explanation, it will henceforth be assumed that the MTM gestures involve simultaneously touching and moving the computing device 100.

The gesture matching module 202 can also incorporate noise canceling functionality 206. The noise canceling functionality 206 reduces the possibility that the IBSM 114 will interpret non-gesture-related behavior as gestures. The noise canceling functionality 206 also reduces the possibility that the IBSM 114 will incorrectly interpret gesture-related behavior as noise, or incorrectly interpret an intended gesture for an unintended gesture, that is, by "confusing" these gestures.

In one case, the noise canceling functionality 206 can define various dead-band thresholds which result in the delayed execution of an MTM gesture. For example, the noise canceling functionality 206 can delay the execution of a rotation-based MTM gesture (to be described below) until the user rotates the computing device 100 beyond a prescribed threshold angular displacement. This will ensure that the IBSM 114 does not interpret small incidental rotations that occur during the normal handling of the computing device 100 as an MTM gesture. In another case, the noise canceling functionality 206 can delay the execution of a static posture gesture until the user has maintained that static pose for a prescribed period of time. Again, this provision will help ensure that the IBSM 114 does interpret transitory positions that occur during handling of the device as MTM gestures. Alternatively, or in addition, the signatures that describe the MTM gestures may incorporate the above-described types of dead-band features as integral parts of their definition.

In addition, or alternatively, the noise canceling functionality 206 can identify other types of contacts and/or movements that are indicative of noise. The noise canceling functionality 206 can then filter this noise out (or otherwise take account of this noise) when interpreting the input information for the presence of MTM gestures. This filtering operation can occur at any juncture of analysis performed by the gesture matching module 202. For example, the gesture matching module 202 can detect and remove noise prior to, during, and/or after the interpretation of a gesture.

In addition, or alternatively, the noise canceling functionality 206 can compare the contacts and/or movements performed by the user with one or more telltale noise signatures. For example, one noise signature may describe a pattern of behavior that is indicative of the user picking up or setting down the computing device 100, e.g., without the intent of making a gesture of any type. The IBSM 114 can disqualify the classification of input information as an MTM gesture if the input information also matches such a noise signature, regardless of whether the input information otherwise matches the pattern of behavior associated with the MTM gesture. Alternatively, or in addition, the signatures that describe the MTM gestures can define (or make reference to) the type of noise information that will override the classification of the input information as MTM gestures.

After detection of a gesture, a behavior executing module 208 executes whatever behavior is associated with the detected gesture. More specifically, as stated above, in a first case, the behavior executing module 208 executes a behavior at the completion of a gesture. In a second case, the behavior executing module 208 executes a behavior over the course of the gesture, starting from that point in time that it recognizes that the telltale gesture is being performed.

Section A.2 (below) describes various types of MTM gestures. Section A.3 describes various actions that may be invoked by the MTM gestures of section A.2. That is, any gesture described in section A.2 can invoke any action described in section A.3.

A.2. Illustrative Gestures

Figure 3:
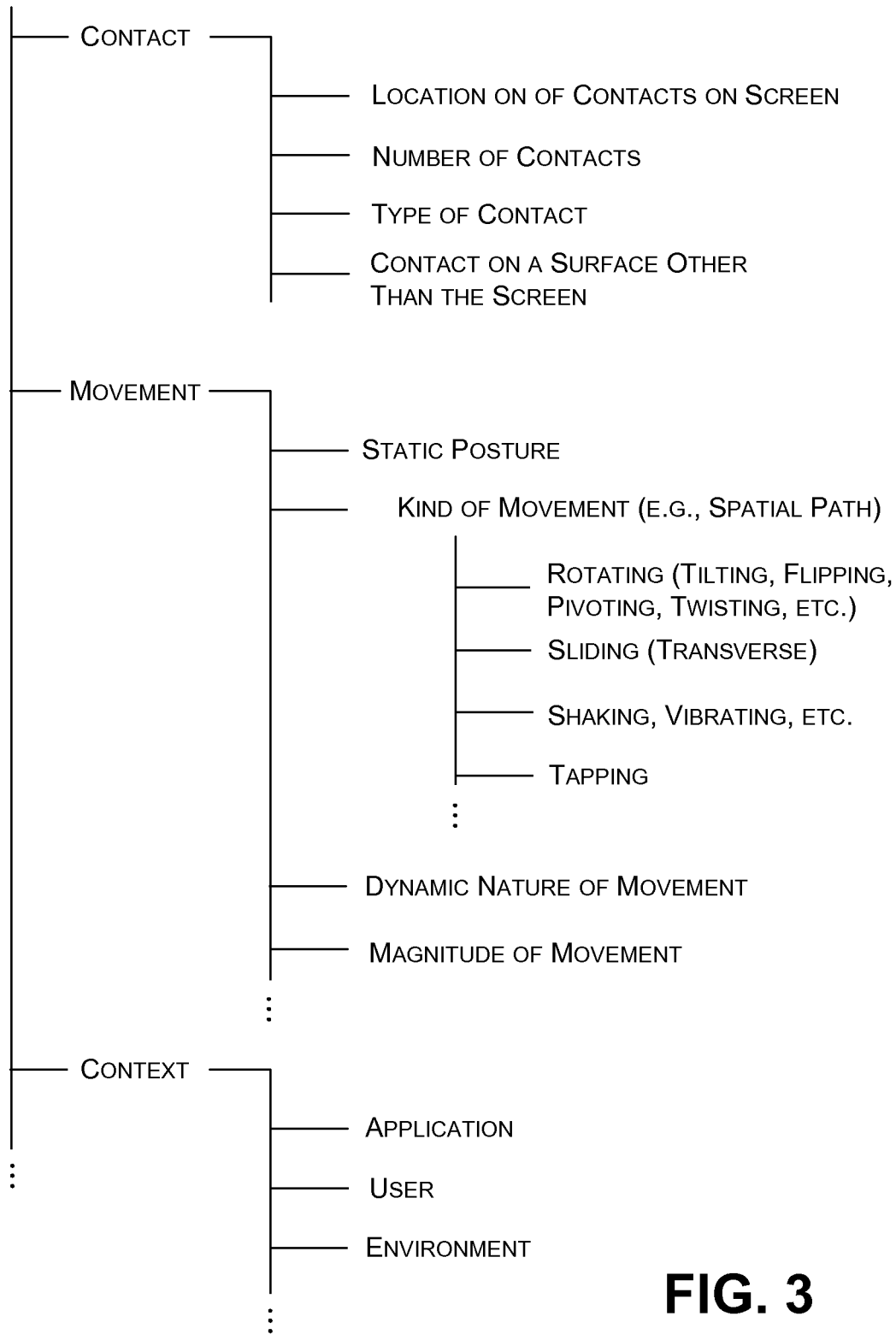
FIG. 3 enumerates different features that can be used to define a multi-touch-movement (MTM) gesture.

FIG. 3 enumerates illustrative features that may be used to define an MTM gesture. These features are grouped into various categories to provide an organized explanation of these features. However, these categories are not to be construed as mutually exclusive. For example, a feature may have properties which warrant its classification into two or more categories. Any entity or entities may define gestures, such as device developers, application developers, end users, standards organizations, etc.

As a first category, an MTM gesture can be defined with respect to the characteristics of the contact associated with the gesture. For example, the MTM gesture can be defined with respect to the location or locations on a touch-sensitive display surface that the user has touched. In addition, or alternatively, the MTM gesture can be defined with respect to the location or locations of other parts of the computing device 100 that the user has touched (such as a back surface, side surface(s), bezel regions, etc. of the computing device 100). In addition, or alternatively, the MTM gesture can be defined with respect to the number of contacts that the user has applied to any surface(s) of the computing device 100. This may correspond, for instance, to the number of fingers that the user has used to touch a surface of the computing device 100. In addition, or alternatively, the MTM gesture can be defined with respect to the type of contact that the user has applied to the surface of the computing device. This may correspond, for instance, to the type of finger that the user has applied, and/or whether the user has applied a finger rather than a stylus, etc. The IBSM 114 can determine the type of finger that has been applied based on any combination of evidence, such as: a detected fingerprint (which can be compared with a set of preregistered fingerprints associated with different fingers belonging to a user); a detected finger contact shape; a detected finger contact placement with respect to other finger and/or hand portion contacts (e.g., a finger placement with respect to a palm contact), and so on. The IBSM 114 can also determine the type of contact that has been performed by analyzing a detected stylus tip contact with respect to any hand portion contact (e.g., a pen contact with respect to palm contact). These contact-related features are mentioned by way of example, not limitation; other implementations can define gestures with respect to additional types of contact-related features.

Some of these contact-related features may also provide evidence regarding the user's position and/or orientation with respect to the computing device 100. For example, the manner in which the user rests his or her palm against a touch-sensitive surface while interacting with the computing device 100 may indicate the position of the user with respect to the computing device 100.

As a second category, an MTM gesture can be defined with respect to the characteristics of the movement associated with the gesture. For example, the MTM gesture can be defined as a static posture of the computing device 100, regardless of the path used to establish that static posture.

In addition, or alternatively, the MTM gesture can be defined with respect to the spatial characteristics of a path over which the computing device 100 is moved. For example, the user may rotate one or more parts of the computing device 100, e.g., to establishing a tilting, flipping, pivoting, and/or twisting motion (to be described in greater detail below). Alternatively, or in addition, the user may move the computing device 100 in a transverse manner, e.g., to slide it within a plane. Alternatively, or in addition, the user may shake or vibrate the computing device 100. Alternatively, or in addition, the user may tap the computing device 100, e.g., by striking the computing device 100 with a finger or multiple fingers and/or other implement(s), or by rapping the computing device 100 against some object (such as a table, a hand, another tablet device that senses a mutually-corresponding signal produced by the collision, etc.).

Alternatively, or in addition, the MTM gesture can be defined with respect to the temporal aspects of the computing device's movement over its prescribed path, referred to herein as the temporal-movement characteristics of the gesture. That is, the temporal-movement characteristics define the speed (i.e., constant rate), acceleration, and/or deceleration of the computing device 100 over the course of its movement. In some cases, for instance, different gestures can be defined based on different constant rates at which the user moves the computing device 100 over the same spatial path. In addition, or alternatively, different gestures can be defined based on different ways in which the user accelerates and/or decelerates the computing device 100 over its path.

For example, a first gesture and a second gesture can both involve rotating the computing device 100 over the same spatial path to perform a scrolling and/or zooming operation.

But the first gesture may involve rotating the computing device 100 at a constant rate while the second gesture may introduce one or more spurts of acceleration and/or deceleration into the movement. The second gesture may cause the IBSM 114 to perform scrolling/zooming by larger increments compared to the first gesture. Thus, a user may perform the second gesture when he or she wishes to quickly advance to a target location or zoom level. The user may perform the first gesture when he or she wishes to advance more slowly to a target location or zoom level.

In certain cases, the gestures that leverage temporal-movement characteristics can be defined with respect to absolute speeds, accelerations, and decelerations. That is, if the IBSM 114 detects movement which matches pre-defined ranges of absolute rates/accelerations/decelerations associated with an MTM gesture, it will determine that the user has performed (or is performing) that gesture. In other cases, these gestures can be defined with respect to relative changes of movement. These gestures are baseline-agnostic. For example, assume that a gesture has a profile which is characterized by slow rotation, followed by fast rotation, followed by slow rotation. The IBSM 114 can detect that the user has performed this gesture if the user's behavior matches this slow-fast-slow pattern, regardless of the absolute rates that are associated with the "slow" rotation and the "fast" rotation in this pattern.

An MTM gesture can also be defined with respect to the magnitude at which any of the above-described motions are performed. For example, the IBSM 114 can define two different gestures based, at least in part, on the force at which tapping and/or shaking is applied, and so on.

These movement-related features are mentioned by way of example, not limitation; other implementations can define gestures with respect to additional types of movement-related features. As stated, the categories of features described above are not mutually exclusive. For example, the magnitude at which a tapping motion is performed can also be classified as defining the temporal-movement characteristics of the gesture.

As a third category, an MTM gesture can be defined with respect to a context in which the gesture is invoked. For example, the IBSM 114 can interpret a particular pattern of contacts and movements in a manner which depends on the application that a user is interacting with at the present time. Thus, for example, the IBSM 114 can interpret the same contacts and movements in two different ways when the user is interacting with two different respective applications.

In addition, or alternatively, the IBSM 114 can interpret a particular pattern of contacts and movements in a manner which depends on the user who is interacting with the computing device 100 at any given time. For example, the IBSM 114 can learn the user-specific characteristics of a particular MTM gesture by analyzing the manner in which the user performs the gesture over a span of time. Alternatively, or in addition, the IBSM 114 can allow the user to manually specify preferences which define the user-specific characteristics of the MTM gesture. The IBSM 114 can then interpret the MTM gesture, when performed by this particular user, by making reference to the learned and/or manually-specified user-specific characteristics of the gesture. This allows the IBSM 114 to more accurately determine the type of gesture that the user has performed. For example, a particular user may perform a zooming operation in a slightly idiosyncratic manner, e.g., by more aggressively tilting the computing device 100 compared to other users. The IBSM 114 can take the user-specific characteristics of this zooming gesture into account to more accurately determine when the particular user has performed the gesture.

In one case, the IBSM 114 learns and applies a single set of user-specific characteristics corresponding to gestures made by a single user, based on the assumption that a single user/owner predominately uses the computing device 100. In other cases, the IBSM 114 can learn and apply different sets of user-specific characteristics corresponding to different respective users. In this approach, the IBSM 114 can determine the user who is interacting with the computing device 100 at any particular moment, and then apply an appropriate set of user-specific characteristics when interpreting the gesture-related behavior of that user. The IBSM 114 can determine the user who is interacting with the computing device 100 by asking the user to manually identify himself or herself (e.g., via a log-in routine or the like), and/or by automatically detecting the user. The IBSM 114 can automatically determine the identity of the user through any mechanism, e.g., by fingerprint analysis, voice analysis, face-recognition analysis, behavioral analysis, etc.

In addition, or alternatively, the IBSM 114 can interpret gestures based on information pertaining to the environment in which the computing device 100 is being used. The environmental information can include, for example, information regarding the presence of features in the environment (either fixed or movable), such as computing devices, persons, furniture, walls, whiteboards, etc. The environment information can also describe the position of these features relative to the computing device 100, e.g., with respect to direction (e.g., as assessed based on relative angular heading), and/or approximate distance, etc.

The above-described context-related features are set forth by way of example, not limitation; other implementations can define gestures with respect to additional types of context-related features.

FIGS. 4-11 illustrate contacts and movements associated with illustrated gestures. In these examples, the user grasps a computing device 402 with two hands (404, 406) to establish two or more points of contact with one or more surfaces of the computing device 402. In other cases, the user may perform the gesture while grasping the computing device 402 with a single hand and/or using a single hand to apply the plural contacts.

Further, the figures indicate that the computing device 402 includes a front display surface 408 that also functions as a touchscreen interface mechanism. A bezel 410 may surround the display surface 408. In some cases, the bezel 410 itself may incorporate a touch-sensitive surface; in other cases, it does not. Further, in other cases, the computing device 402 can entirely dispense with the bezel 410. In such an implementation, the display surface 408 may extend to the edges of a front surface of the computing device 402.

As a final prefatory note, the figures illustrate many MTM gestures in which the user applies two or more points of contact to a peripheral region associated with the computing device 402. (The term "point" refers to a general locus at which a user touches the computing device 402, also referred to herein as a touch "contact," rather than a single mathematical point.) For example, the peripheral region may encompass the region defined by the bezel 410 and/or the outer portions of the display surface 408. However, an MTM gesture can be defined with respect to points of contacts applied at any location(s) on any surface(s) of the computing device 402.

In any of these cases, the fact that the user has applied two simultaneous points of contact to the touch-sensitive surface(s) of the computing device 402 alerts the IBSM 114 that the user may intend to perform an MTM gesture, as opposed to some other gesture or input action or incidental contact. The IBSM 114 can thereafter interpret any subsequent movement of the computing device 402 as part of the MTM gesture, rather than noise (e.g., inadvertent movement). In this sense, the application of two or more points of contacts can be considered as triggering an MTM-related state transition.

Figure 4:
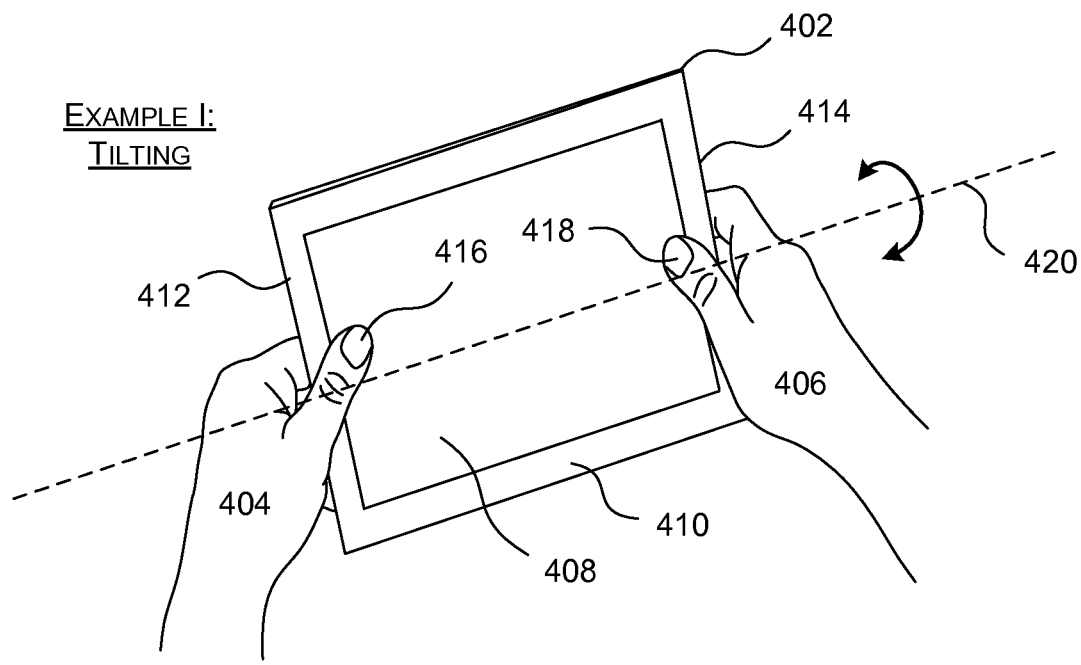
FIGS. 4-12 illustrate behavior and/or static poses associated with different types of MTM gestures.
Figure 5:
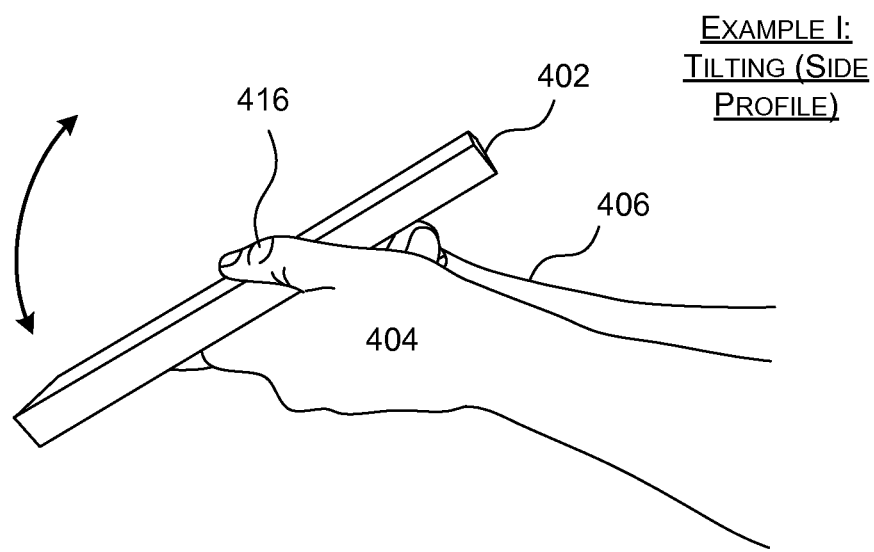

Beginning with FIG. 4, this figure shows an MTM gesture that involves a tilting movement. In this gesture, the user grasps the computing device 402 with two hands (404, 406) along two opposing edges (412, 414) of the computing device 402 device. More specifically, the two edges (412, 414) have respective lengths. The user grasps these edges at respective points that lie generally in the middle of these lengths. In doing so, the user applies his or her thumbs (416, 418) and/or other fingers to a peripheral portion of the touch-sensitive display surface 408. As the display surface 408 incorporates a touch-sensitive surface, the touch input mechanism 108 produces touch input information in response to the user's finger contacts.

The user then proceeds to rotate the computing device 402 about an axis 420 that generally passes through the contacts established by the user's hands (404, 406). In some cases, this particular MTM gesture can be defined by a single rotational sweep of the computing device 402, e.g., by moving the computing device 402 in a downward direction away from the user, or by moving the computing device 402 in an upward direction towards the user. In this case, the IBSM 114 can distinguish between two different gestures based on the direction in which the user tilts the computing device 402. In other cases, an MTM gesture can be defined with respect to two or more rotational sweeps of the computing device 402, e.g., by moving the computing device 402 first in the downward direction and then in the upward direction.

More generally, any of the features enumerated in FIG. 3 can be used to define a tilting MTM gesture (or any other gesture described herein). For example, the tilting MTM gesture can be defined (and distinguished from other MTM gestures) with respect to any temporal-movement characteristics of the rotational sweep(s) performed by the user (e.g., rates, accelerations, decelerations, etc.). In addition, or alternatively, the tilting MTM gesture can be defined (and distinguished from other MTM gestures) with respect to the maximum angular displacement(s) produced by the tilting movement. In addition, or alternatively, the tilting MTM gesture can be defined (and distinguished from other MTM gestures) based on the location(s) at which the user grasps the computing device 402. In addition, or alternatively, the tiling MTM gesture can be defined (and distinguished from other MTM gestures) based on the starting and/or ending spatial orientation(s) of the computing device 402. But in other cases, the tilting MTM gesture can be defined independent of the starting and/or ending spatial orientation(s) of the computing device 402.

Figure 6:
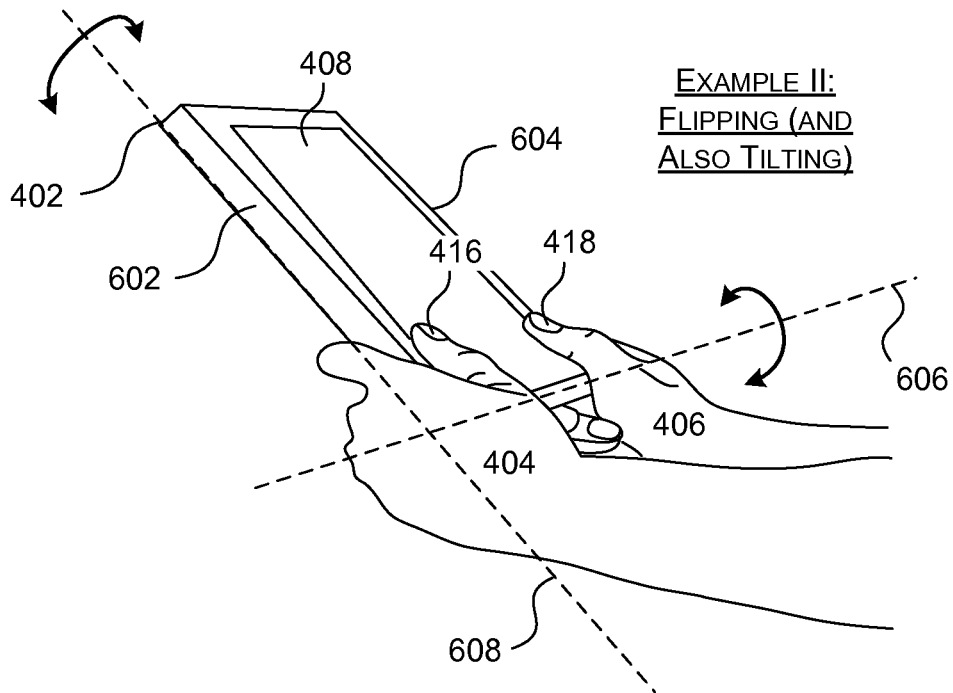
Figure 7:
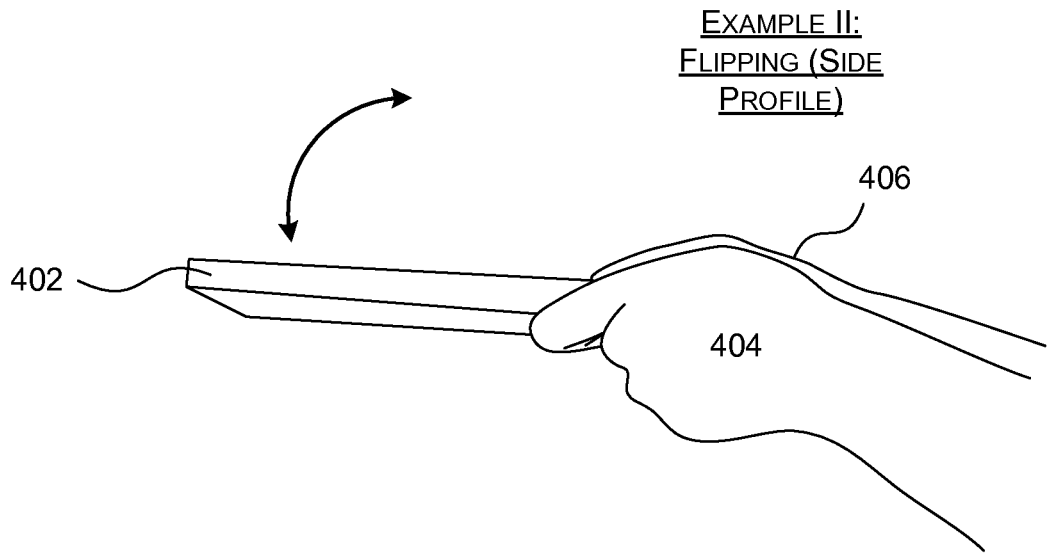

FIGS. 6 and 7 show an MTM gesture that involves a flipping movement. In this gesture, the user again grasps the computing device 402 with two hands (404, 406) along two opposing edges (602, 604) of the computing device 402 device. In this case, however, the user grasps the edges (602, 604) at laterally-adjacent corners of the two edges (602, 604). In doing so, the user applies his or her thumbs (416, 418) and/or other fingers to a peripheral portion of the touch-sensitive display surface 408 at the two respective laterally-adjacent corners of the display surface 408.

The user then proceeds to rotate the computing device 402 about an axis that generally passes through one of the edges of the computing device 402. For example, the user can rotate the computing device 402 about an axis 606 which passes through the contacts established by the user's hands (404, 406). (This movement therefore also qualifies as a tilting movement.) Alternatively, the user can rotate the computing device 402 about an axis 608 which passes along the edge 602 or any other axis that passes through any other edge of the computing device 402. Once again, the flipping MTM gesture can be defined (and distinguished from other MTM gestures) with respect to any of the features enumerated in FIG. 3, such as, but not limited to: the maximum angular displacement(s) produced by the flipping movement; the orientation(s) of the computing device 402 at the start and/or end of the flipping movement; the temporal-movement characteristics of the flipping movement; and/or the location(s) at which the user grasps the computing device 402, and so on.

Figure 8:
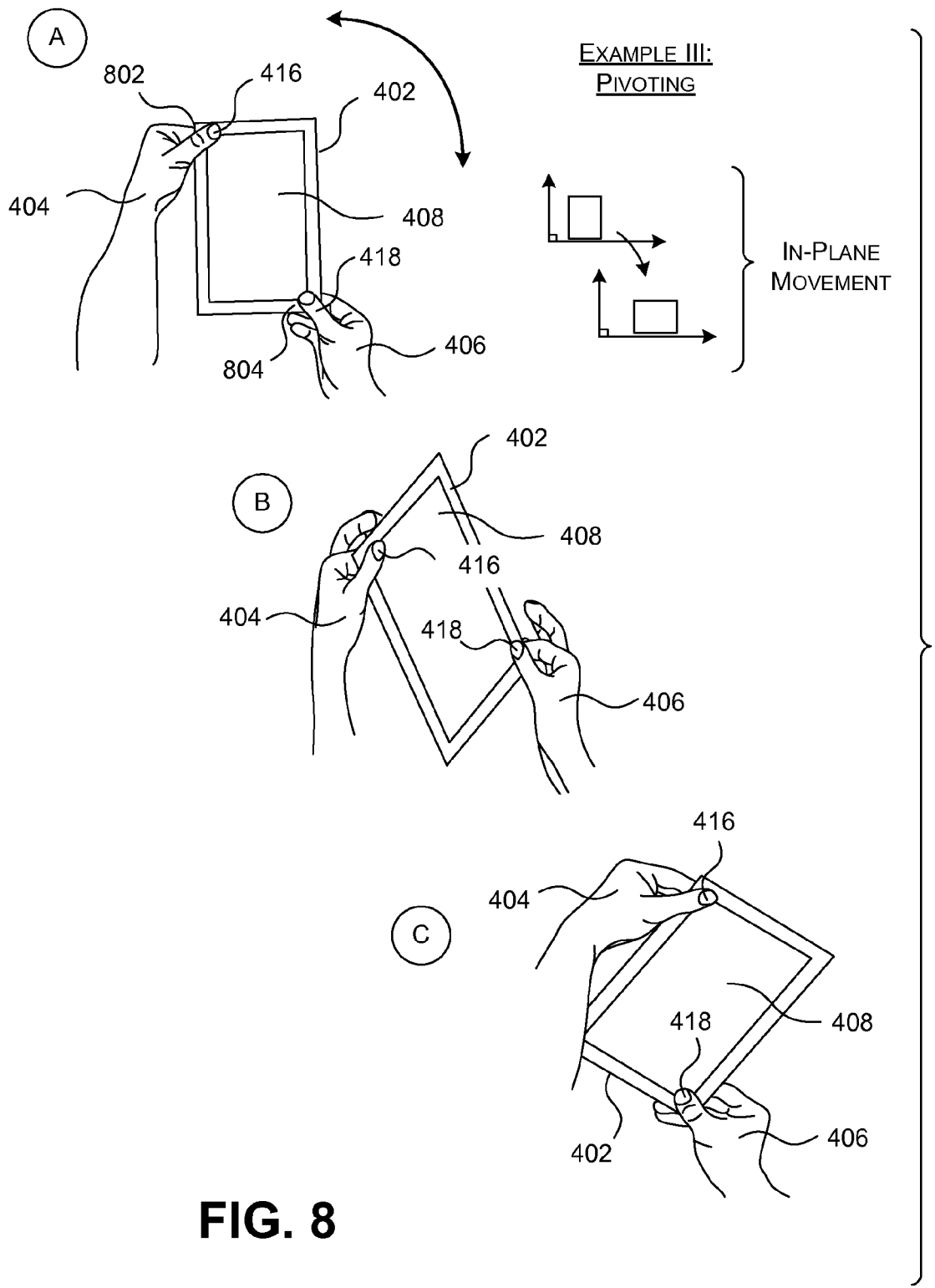

FIG. 8 shows an MTM gesture that involves a pivoting movement. In this gesture, in state A, the user grasps the computing device 402 with two hands (404, 406) along diagonally-opposing corners of (802, 804) of the computing device 402 device. In doing so, the user applies his or her thumbs (416, 418) and/or other fingers to a peripheral portion of the touch-sensitive display surface 408.

The user then proceeds to rotate the computing device 402 in a plane that is generally parallel to the display surface 408. In some cases, this particular MTM gesture can be defined by a single pivotal sweep of the computing device 402 in a clockwise direction (resulting in state B of FIG. 8) or counterclockwise direction (resulting in state C in FIG. 8). Moreover, the IBSM 114 can distinguish between two different gestures based on the direction in which the user pivots the computing device 402. In other cases, an MTM gesture can be defined with respect to two or more pivotal sweeps of the computing device, e.g., by moving the computing device 402 first in the clockwise direction and then in the counterclockwise direction. Once again, the pivoting MTM gesture can be defined (and distinguished from other MTM gestures) with respect to any of the features enumerated in FIG. 3, such as, but not limited to: the maximum angular displacement(s) produced by the pivoting movement; the orientation(s) of the computing device 402 at the start and/or end of the pivoting movement; the temporal-movement characteristics of the pivoting movement; and/or the location(s) at which the user grasps the computing device 402, and so on.

Figure 9:
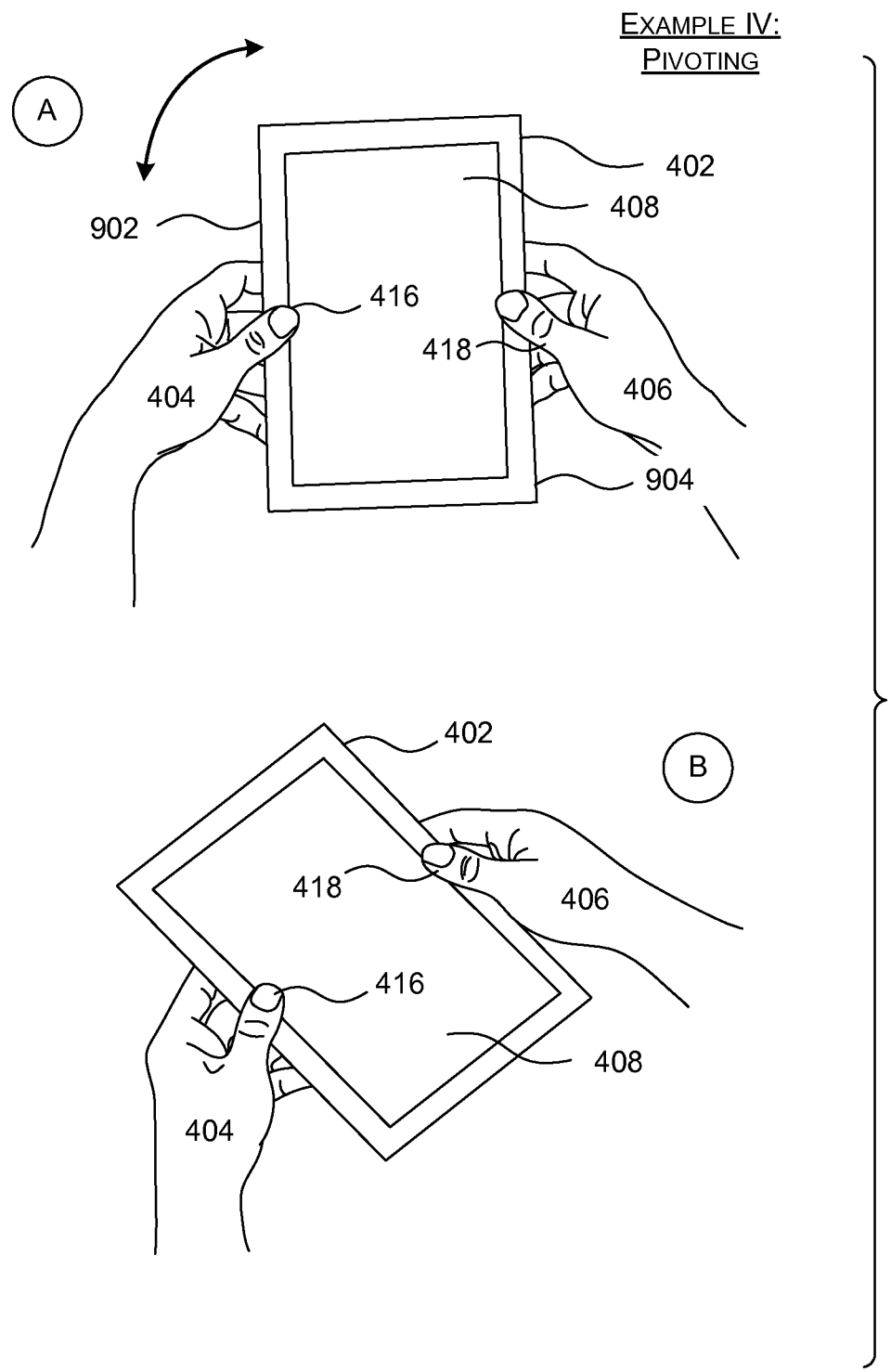

FIG. 9 shows another gesture that is defined with respect to a pivoting movement. In this case, however, the user grasps the computing device at respective intermediary points along the opposing edges (902, 904) of the computing device 402, rather than at opposing corners (as in the case of FIG. 8). The user then proceeds to rotate the computing device 402 in a plane that is generally parallel to the display surface 408.

Figure 10:
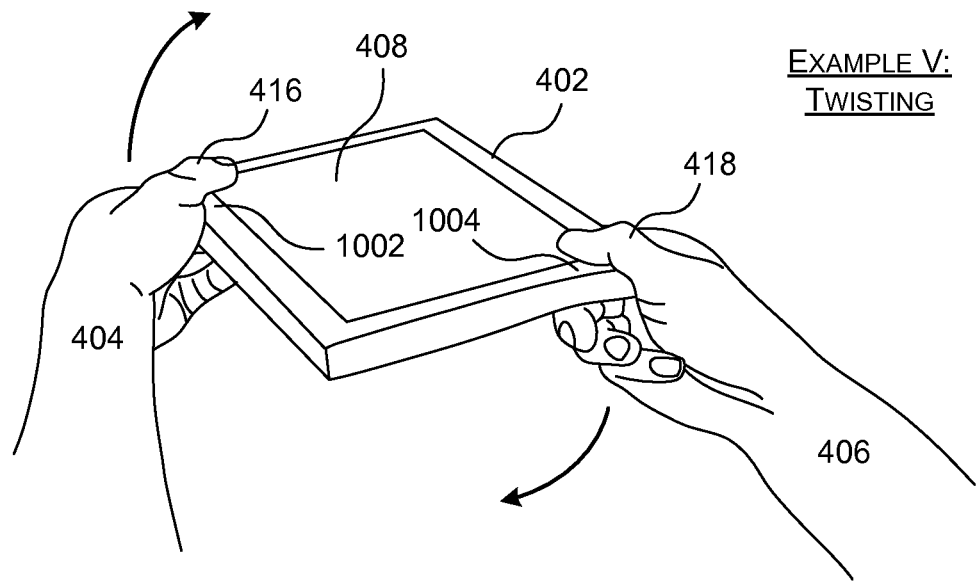

FIG. 10 shows an MTM gesture that involves a twisting movement. In this gesture, the user grasps the computing device 402 with two hands (404, 406) along diagonally-opposing corners (1002, 1004) of the computing device 402. In doing so, the user applies his or her thumbs (416, 418) and/or other fingers to a peripheral portion of the touch-sensitive display surface 408.

The user then proceeds to rotate the computing device 402 in such a manner that the corner 1002 is moved in a first direction towards a reference point, while the corner 1004 is moved in a second direction away from the reference point. For example, if the display surface 408 is facing the user (and thus the user may correspond to the reference point), the user can pull the corner 1002 up towards himself or herself; at the same time, the user can push the corner 1004 away from himself or herself. For the particular positioning of the user's hands (404, 406) shown in FIG. 10, this type of rotation does not correspond to a tilting motion (because it does not occur about an axis which connects the user's contact positions), nor does it correspond to a pivoting movement (because it does not occur in a plane that is parallel to the display surface 408). But for other positions of the hands (404, 406), what is considered a twisting movement may also correspond to some other kind of rotation already described.

Once again, the twisting MTM gesture can be defined (and distinguished from other MTM gestures) with respect to any of the features enumerated in FIG. 3, such as, but not limited to: the maximum angular displacement(s) produced by the twisting movement; the orientation(s) of the computing device 100 at the start and/or end of the twisting movement; the temporal-movement characteristics of the twisting movement; and/or the location(s) at which the user grasp the computing device 402, and so on. For example, the user can perform a twisting movement for the thumb placements shown in FIG. 4. The IBSM 114 can interpret this gesture as a different type of twisting gesture than the twisting gesture described above with respect to FIG. 10.

Figure 11:
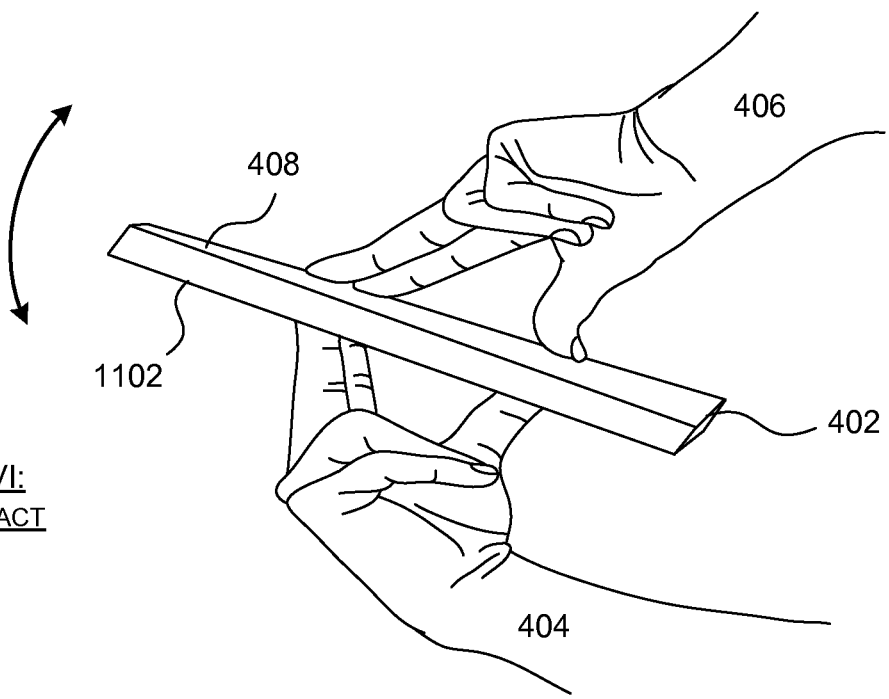

FIG. 11 shows an MTM gesture in which the user applies one or more fingers of the hand 406 to touch a front surface of the computing device 402. For example, the user may apply one or more fingers to the display surface 408 that is disposed on the front surface of the computing device 402. Optionally, the user may use the finger(s) of the hand 406 to select an item of any type on the display surface 408 on which the some gesture-related behavior is to be performed, such as by using a single finger to touch the item, or two or more fingers to frame a region, etc. The user may then apply one or more fingers of the hand 404 to touch a back surface 1102 of the computing device 402, thereby holding the computing device 402 like a tray. More generally stated, the user uses a first hand to touch any first surface of the computing device and a second hand (and/or the first hand) to touch any second surface of the computing device. In the particular illustrated case of FIG. 11, the first surface and the second surface are opposite in the sense the normal of the first surface is generally pointed in an opposite direction to the normal to the second surface. In other cases (not shown), the user may alternatively, or in addition, touch any of the side surfaces of the computing device 402 and/or any other "non-front" surface(s).

The non-front surface(s) that the user touches each include a touch-sensitive surface, which may or may not be integrated with a display surface. This feature can be implemented in any manner, such as by providing a touch-sensitive display surface on any non-front surface. Further, in the case of a booklet computing device (to be described below), a first section can be rotated relative to a second section such that its back surface faces the back surface of the second section; in this configuration, the normal to the first section will point in an opposite direction to the normal to the second surface. As an additional feature, the computing device 402 can optionally include functionality that visualizes the positions of the user's fingers that are placed on the back surface 1102 of the computing device 402, e.g., using technology described in Forelines, et al., "LucidTouch: a See-through Mobile Device," *Proceedings of the* 20*th Annual ACM Symposium on User interface Software and Technology,* 2007, pp. 269-278.

After establishing the type of contact shown in FIG. 11, the user can move the computing device 402 in any manner to complete a back-touching MTM gesture (meaning a gesture that involves, as one feature, touching a back surface of the computing device 402). For example, the user can tilt, flip, or twist the computing device. In addition, a back-touching MTM gesture can be defined (and distinguished from other MTM gestures) with respect to any of the features enumerated in FIG. 3, such as, but not limited to: the maximum angular displacement(s) produced by the movement; the orientation(s) of the computing device 100 at the start and/or end of the movement; the temporal-movement characteristics of the movement; and/or the location(s) at which the user grasp the computing device 402.

Figure 12:
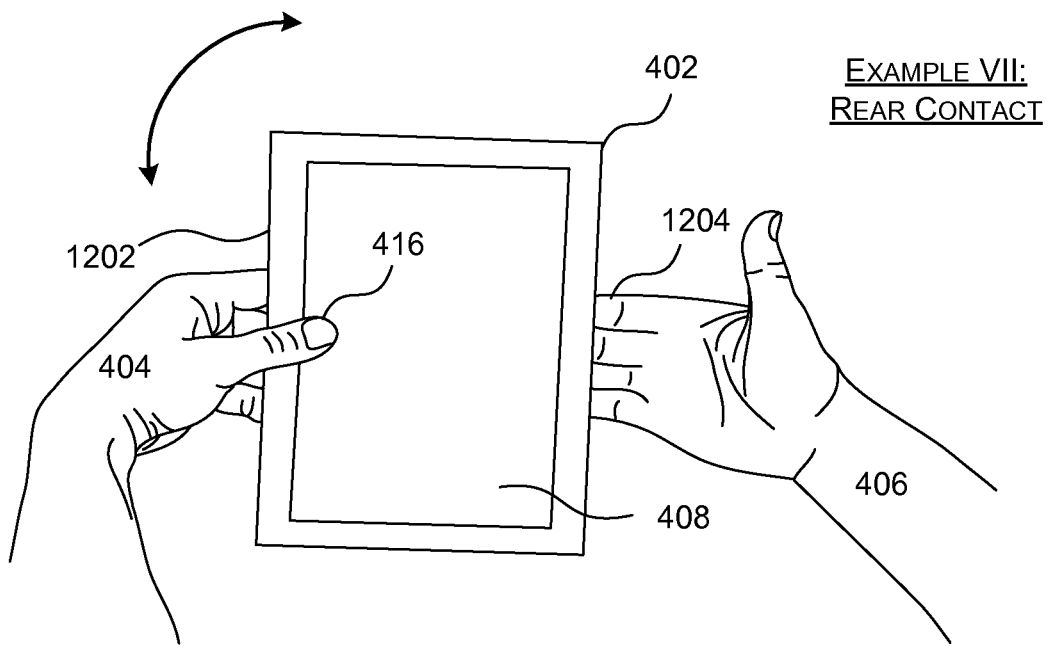

FIG. 12 shows another back-touching MTM gesture in which the user applies a contact to a back surface of the computing device 402. In this case, the user applies the thumb 416 of the hand 404 to touch a point along the periphery of the display surface 408 that is generally midway along a side edge 1202. The user then places one or more fingers 1204 of the other hand 406 on the back of the computing device 402. The user then pivots the computing device 402 about a pivot point defined by the thumb 416, in a plane that is generally parallel to the display surface 408. In this movement, the fingers 1204 of the hand 406 remain in contact with the back surface of the computing device 402. Further, these fingers 1204 can help guide the pivoting movement. Other back-touching MTM gestures of this kind can be defined based on different ways of touching the computing device 100 and/or moving the computing device 100.

As a general clarification, the explanation above described gestures which include a single class of movement, such as a tilting, flipping, pivoting, twisting, etc. But any MTM gesture can be defined with respect to two or more types of motions that are applied at the same time or in temporal succession. For example, a gesture can be performed by sliding the computing device 402 in a plane while simultaneously rotating it, or by sliding it and then rotating it (or vice versa). In addition or alternatively, any MTM gesture can include shaking movement, vibratory movement, tapping-induced movement, and so on, or any combination thereof. These non-rotating movements can be applied by themselves or in combination with other types of movements. To cite one example, the user can perform a particular MTM gesture by holding the computing device 402 in the manner shown in FIG. 4, while tapping one or more fingers on the rear touch-sensitive surface of the computing device 402.

Figure 13:
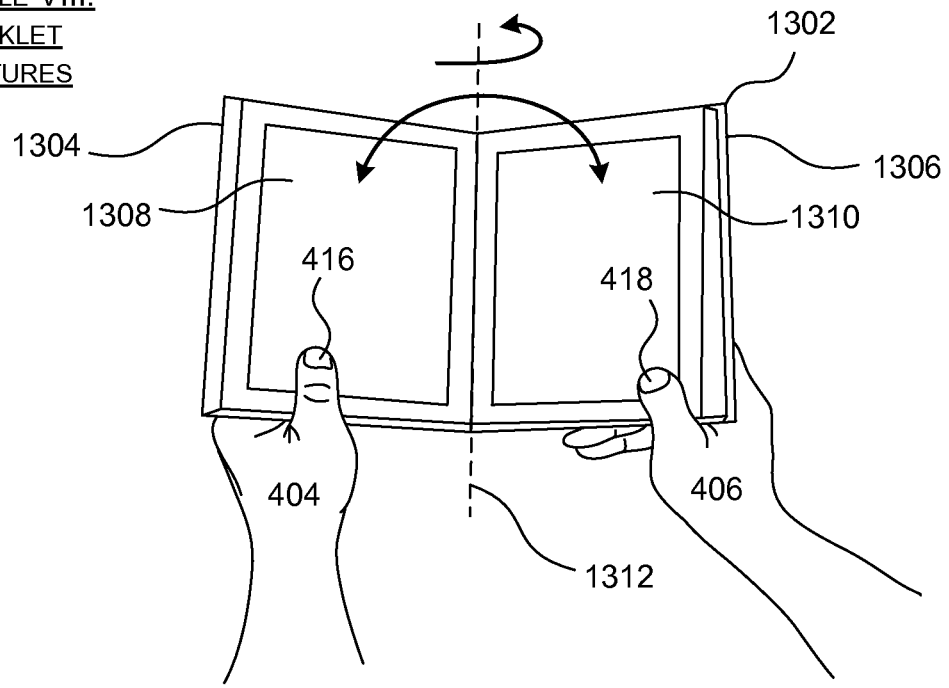
FIGS. 13-15 illustrate behavior and/or static poses associated with additional types of MTM gestures. In this case, the computing device on which these gestures are performed corresponds to a booklet computing device having two or more sections.

FIG. 13 shows a booklet computing device 1302 that includes two sections—namely a first section 1304 and a second section 1306. Although not shown, other booklet computing devices can include three or more sections. The booklet computing device 1302 can use any coupling mechanism to couple the first section 1304 to the second section 1306, such as, without limitation, a hinge mechanism. Further, in some implementations, the coupling mechanism can allow a user to detach the first section 1304 from the second section 1306.

In one implementation, the first section 1304 includes a first display surface 1308, while the second section 1306 includes a second display surface 1310. Further, in some implementations, both the first section 1304 and the second section 1306 may incorporate touch input mechanisms. For example, the first display surface 1308 and the second display surface 1310 may each incorporate touchscreen interface mechanisms. The booklet computing device 1302 can also include touch-sensitive surfaces disposed on the back of the first section 1304 and/or the back of the second section 1306, and/or on any other parts of the booklet computing device 1302.

The user may apply an MTM gesture using the booklet computing device 1302 by touching any touch-sensitive surface(s) of the booklet computing device 1302. In the merely illustrative case of FIG. 13, the user grasps the first section 1304 with the hand 404, placing his or her thumb 416 on the first display surface 1308. The user grasps the second section 1306 with the hand 406, placing his or her thumb 418 on the second display surface 1310. Again, this represents one of many possible finger placements. For instance, in another case (not shown), the user can apply fingers to the two sections (1304, 1306) of a booklet computing device 1302 in the manner shown in FIG. 4 (or any other of the preceding figures). Different booklet MTM gestures can be defined with respect to the above-described types of differing finger placements.

The user may then proceed to move the booklet computing device 1302 in any manner, e.g., by performing any type of rotating, sliding, shaking, vibrating, and/or tapping movement described above. Different booklet MTM gestures can be defined with respect to any of the features enumerated in FIG. 3, such as by leveraging different paths of movement, different starting and/or ending orientations of movement, different temporal-movement characteristics of movement, different maximum displacements produced by the movements, and so on.

Figure 14:
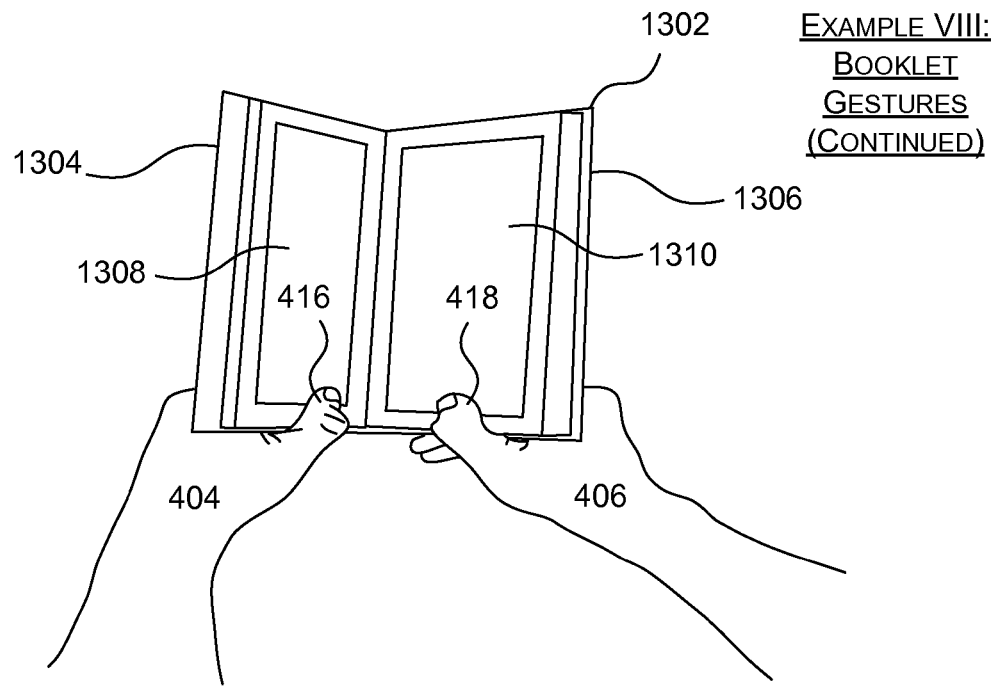

In addition, or alternatively, a booklet MTM gesture may be defined with respect to movement of the first section 1304 relative to the second section 1306. For example, the user can dynamically rotate the first section 1304 relative to the second section 1306 in a first and/or second direction about an axis 1312 associated with the coupling mechanism. For instance, FIG. 14 shows a case in which the user has moved the sections (1304, 1306) closer together relative to the starting state shown in FIG. 13.

Figure 15:
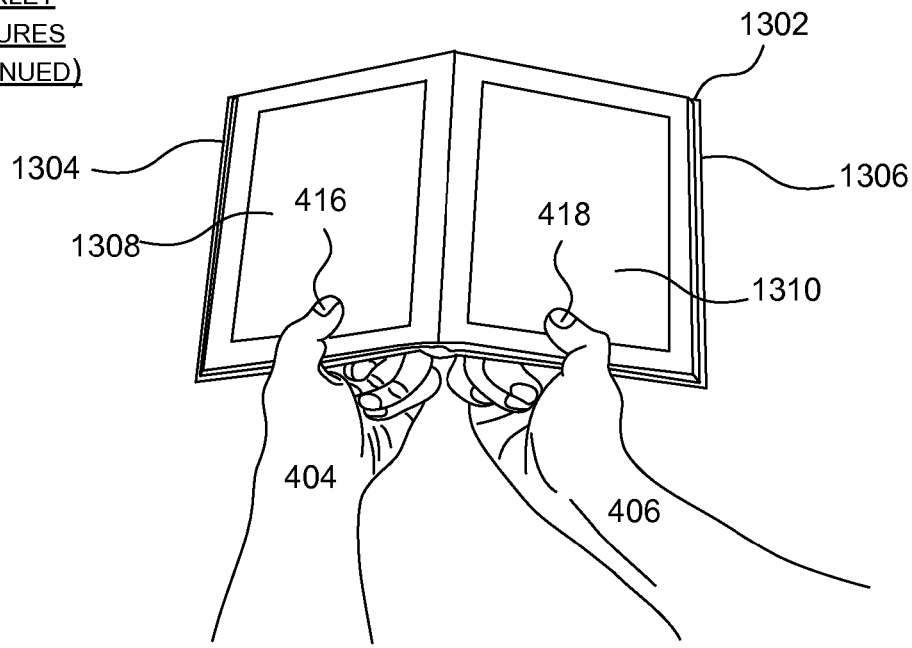

FIG. 15 shows a case in which the user has moved the sections (1304, 1306) farther apart relative to the starting state shown in FIG. 13. Indeed, in the case of FIG. 15, the angle between the two sections (1304, 1306) exceeds 180 degrees, meaning that the user has hyperextended the sections (1304, 1306). More specifically, a booklet MTM gesture can be defined with respect to a single sweep about the axis 1312, or with respect to two or more sweeps, e.g., by decreasing the angle between the sections (1304, 1306), followed by increasing the angle between the sections (1304, 1306). In addition to the above-stated features, different MTM gestures can be defined with respect to any of: (a) for single-sweep gestures, the direction of the single sweep (that is, depending on whether the user is opening or closing the booklet computing device 1302); (b) for plural-sweep gestures, the combination of sweeps that define the gesture; (c) whether the first section 1304 is moved and the second section 1306 is held stationary (or vice versa), or whether both sections (1304, 1306) are moved; (d) and/or the temporal-movement characteristics of the movement of section(s) (1304, 1306), and so on.

In all of the examples described so far, the MTM gestures were defined with respect to the dynamic movement of the computing devices (402, 1302) over a prescribed path. Alternatively, or in addition, some MTM gestures can be defined with respect to the static posture of the computing devices (402, 1302), regardless of the path used to produce the static posture. For example, consider the case of FIGS. 6 and 7. The IBSM 114 may detect that the user performs a first gesture when he or she holds the computing device 402 in a generally upright position, as shown in FIG. 6. More specifically, the IBSM 114 may detect that the user performs this gesture when the user holds the computing device 402 at an angle that exceeds a prescribed threshold angle (relative to a horizontal plane), for a period of time that exceeds a prescribed threshold time (while simultaneously applying at least two contacts to the display surface 408). The IBSM 114 may detect that the user performs a second gesture when he or she holds the computing device 402 such that the display surface 408 is generally parallel to a horizontal plane, as shown in FIG. 7 (while simultaneously applying at least two contacts to the display surface 408).

As another example, the IBSM 114 can detect that the user has performed a particular static posture gesture by producing and holding a particular angle between the first section 1304 and the second section 1306 of the booklet computing device 1302 of FIG. 13 (while simultaneously applying two contacts to the booklet computing device 1302). For example, the IBSM 114 can detect that the user has performed a first gesture by producing the relatively small angle between sections (1304, 1306) shown in FIG. 14, whereas the user has performed a second gesture by producing the large hyperextend angle between sections (1304, 1306) shown in FIG. 15. In any of these posture-related examples, the IBSM 114 can also consider other environmental factors which indicate the manner in which the user is currently using the computing device 100.

A.3. Illustrative Actions that May be Invoked

The MTM gestures described above can invoke any type of actions. In some cases, a device developer may establish a nexus between a particular MTM gesture and a resultant action. This type of MTM gesture is application-agnostic in the sense the IBSM 114 will respond to the MTM gesture in the same manner regardless of the application that is being run at the time that the MTM gesture is performed. In another case, an application developer may establish an association between a particular MTM gesture and a resultant action. In this case, the IBSM 114 can respond to the same MTM gesture in a manner that depends on the application that is being run at the time that the MTM gesture is performed. In addition, or alternatively, the computing device 100 may allow the user to define the action that will be invoked in response to the execution of a particular MTM gesture.

Figure 16:
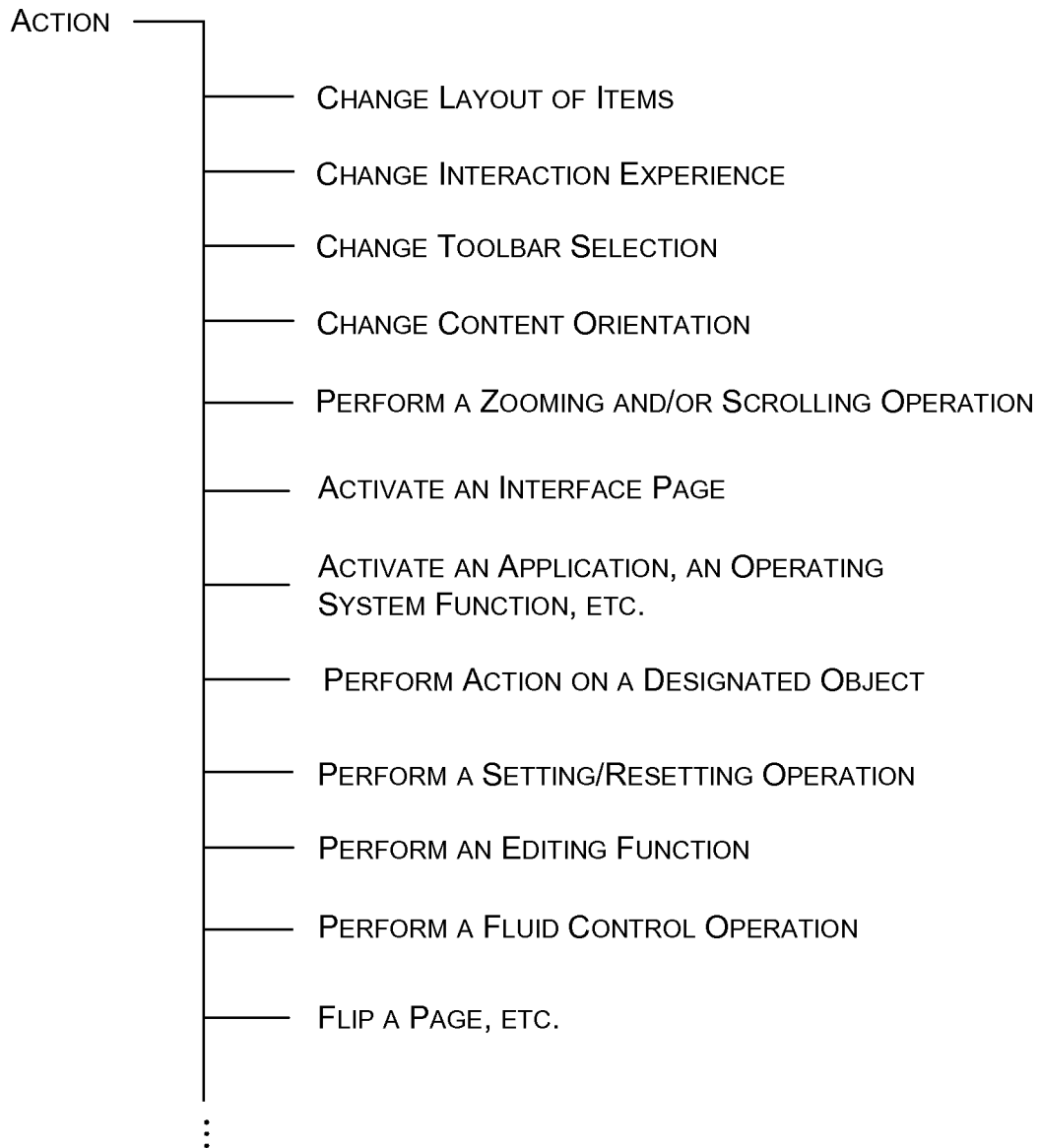
FIG. 16 enumerates different actions that may be invoked by MTM gestures.

FIG. 16 provides a non-exhaustive list of possible actions that may be invoked by different MTM gestures. These actions are grouped into various categories to provide an organized explanation of the actions. However, these categories are not to be construed as mutually exclusive. For example, an action may have properties which warrant its classification into two or more categories. Further, as mentioned above, the IBSM 114 can invoke an action after the completion of the gesture in its entirety, or in the course of the user' execution of the gesture.

Figure 17:
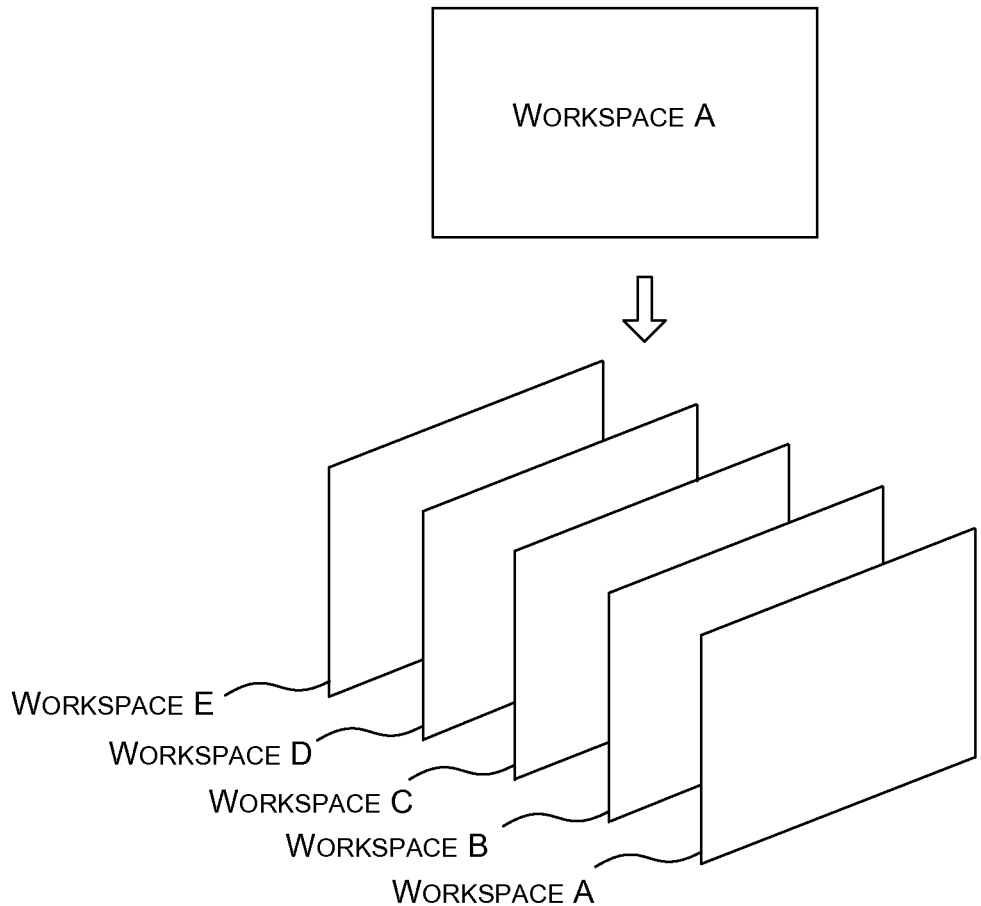
FIG. 17 illustrates a transition from a stacked view of a collection of items to an axonometric view of the collection of items. The transition between views illustrated in FIG. 17 may be invoked by an MTM gesture.
Figure 18:
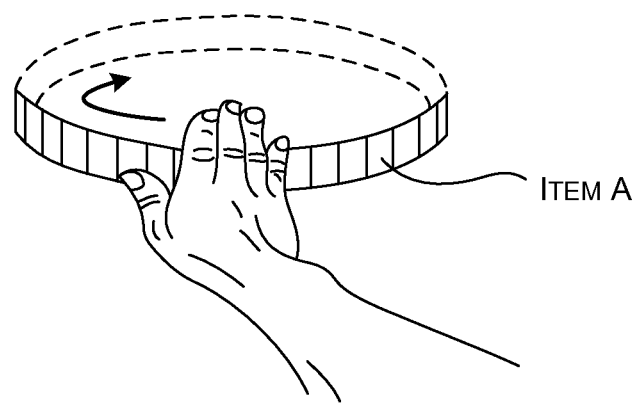
FIG. 18 illustrates a carousel view of the collection of items. The transition to and/or from the carousel view may be invoked by an MTM gesture.

In a first case, the IBSM 114 can invoke a particular view in response to determining that the user has performed (or is performing) an MTM gesture. For example, the IBSM 114 can change the layout of items on a display surface in response to determining that the user has performed (or is performing) an MTM gesture. For instance, consider the implementation shown in FIG. 17. In a first state, a display surface presents a collection of layered items (such as workspaces) in a stacked manner, such that the display surface only shows the topmost item (e.g., workspace A). Upon detecting an MTM gesture, the IBSM 114 can invoke an axonometric view. In this view, the display surface illustrates the individual members in the collection of items. For example, the axonometric view may simulate the rotation of the stack of items in manner such that its depth-related dimension in now visible. The user can then select or otherwise interact with any item in the collection of items. In the alternative case of FIG. 18, the display surface presents a collection of items in a carousel-type format in response to detecting that the user has performed (or is performing) an MTM gesture.

In another case, the IBSM 114 can modify an interaction experience in response to the determining that the user has performed (or is performing) an MTM gesture. The user interaction experience defines any manner in which the computing device 100 presents information to the user and/or receives input from the user. As a general principle, the IBSM 114 can present an interface experience to the user which facilitates the user's interaction with the computing device 100 for a current condition which is presumed to affect the user. The IBSM 114 infers the current condition of the user based on the gesture that the user has performed (or is performing), in optional conjunction with other evidence. For example, the IBSM 114 can conclude that the user may be viewing the content on the display surface at a more oblique angle for the static posture shown in FIG. 7, compared to the static posture shown in FIG. 6. The IBSM 114 can respond by displaying textual content in a larger font for the scenario of FIG. 7 (compared to the scenario of FIG. 6), so as to make the content easier to read in the static posture shown in FIG. 7.

In another case, the IBSM 114 can also change the options available to the user in response to determining that the user has performed (or is performing) an MTM gesture. For example, the IBSM 114 can provide a first set of toolbar buttons for the static posture shown in FIG. 6 and a second set of toolbar buttons for the static posture shown in FIG. 7.

In another case, the IBSM 114 can also change the orientation at which content is presented on a display surface in response to determining that the user has performed (or is performing) an MTM gesture. For example, the IBSM 114 can change from a landscape mode to a portrait mode in response to the pivoting operation shown in FIG. 8, or vice versa.

In another case, the IBSM 114 can perform a zooming operation, panning operation, and/or scrolling operation in response to any of the MTM gestures described above. For example, the IBSM 114 can control a zoom level in a continuous manner based on an angular displacement produced by the tilting movement shown in FIG. 4.

In another case, the IBSM 114 can activate a particular interface page in response to determining that the user has performed (or is performing) an MTM gesture, such a particular home page or the like.

In another case, the IBSM 114 can invoke a particular application or operating system function (or any other function) in response to determining that the user has performed (or is performing) an MTM gesture. The application may correspond to functionality that is provided at a local location (with respect to the computing device 100) and/or at a remote location. For example, in one case the application may correspond to locally-stored application program that executes on a runtime system of the computing device 100. In another case, the application may correspond to a remote web page or web service, etc.

In another case, the IBSM 114 can perform any action on a designated item in response to determining that the user has performed (or is performing) an MTM gesture. For example, the user can touch a particular item on the display surface of the computing device 100 with one or more fingers, and then move the computing device 100 in a telltale manner. The IBSM 114 may interpret this combination of behavior as a request to perform some pre-determined behavior on the designed item, such as by deleting or erasing the item, transferring the item from a first location to a second location, changing the visual appearance of the item, changing the order of the item with respect to other items and so on. For example, in the example of FIG. 11, the user can use the finger(s) of hand 406 to designate an item (or items), with the other hand 404 holding the computing device 402 from its underside. The IBSM 114 interprets the gesture as a request to transfer the designated item(s) to one or more nearby computing devices and/or other target destination(s), or otherwise share the item(s) with the nearby computing device(s).

In another case, the IBSM 114 can perform a setting/resetting operation in response to a determination that the user has performed (or is performing) an MTM gesture. For example, the IBSM 114 can erase the contents of one or more workspaces in response to the user flipping the computing device 402 over and back again in the manner shown in FIG. 4. Or the IBSM 114 can reset (or set) a form, a control setting, a game state, etc. in response to the type of movement shown in FIG. 4. Alternatively, if the computing device 402 has a display surface on both of front side and back side, this gesture can be executed by just flipping the computing device 402 over once, e.g., by an angle of 180 degrees. The user can then proceed to work on the "back" display surface of the computing device 402, which has been cleared by the tilting movement.

In another case, the IBSM 114 can control an editing function in response to a determination that the user has performed (or is performing) an MTM gesture. For example, assume that the user is creating a drawing using a drawing application. The IBSM 114 can modulate any visual attribute of a graphical item (e.g., a thickness, color, hue, etc.) in response to an MTM gesture. For example, the user can designate a graphical item and then perform the tilting movement shown in FIG. 4 to change some visual attribute of that item in a continuous manner; for example, the angular displacement of the computing device 402 may define hue, size, or transparency, etc. assigned to the item in a continuous manner.

In the particular case of the booklet computing device 1302 of FIG. 13, the IBSM 114 can interpret a rapid flip of a section (1304 or 1306) relative to another section as a request to flip a page or chapter, bookmark a page or chapter, delete a page or chapter, move an item from one section to another, and so on.

In some of the cases described above, the IBSM 114 can control a designated item in a fluid manner in response to detecting that a gesture has been performed or is being performed. For example, in response to the ongoing detection of the gesture, the IBSM 114 can set a parameter, set a range of values, specify a movement path, etc. that affects the item in a real-time manner. The item may correspond to an icon or other graphical object that appears in a presentation, a region of a presentation, an entire application screen, a tool, a command, and so forth. The user may designate the item in any manner described above, such as by touching the item with a finger, framing the item with two or more fingers, and so on.

To repeat, the actions set forth above are described by way of example, not limitation. Any implementation can associate any invoking behavior with any gesture to achieve any environment-specific objective.

B. Illustrative Processes

Figure 19:
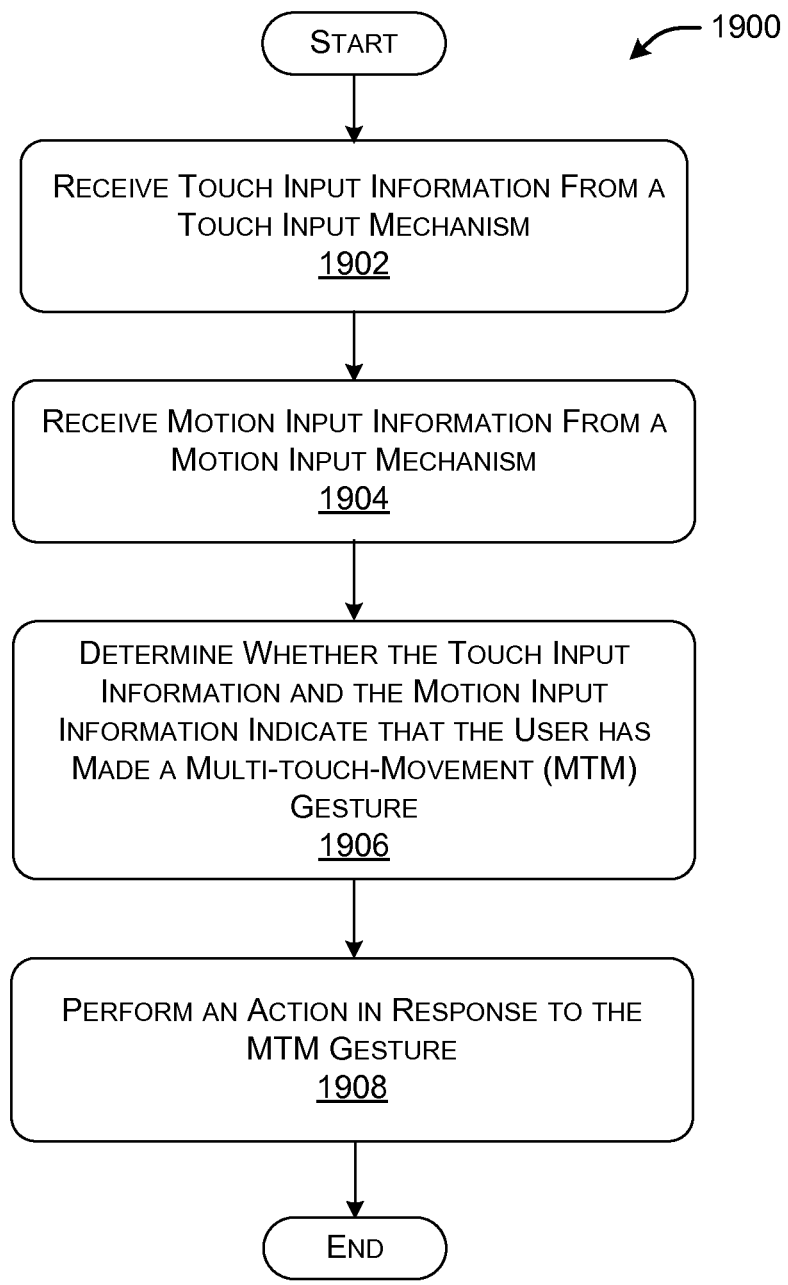
FIG. 19 shows an illustrative procedure that explains one manner of operation of the IBSM of FIGS. 1 and 2.

FIG. 19 shows a procedure 1900 that represents an overview of one manner of operation of the interpretation and behavior selection module (IBSM) 114 of FIGS. 1 and 2. Since the principles underlying the operation of the IBSM 114 have already been described in Section A, certain operations will be addressed in summary fashion in this section.

In block 1902, the IBSM 114 receives touch input information from the touch input mechanism(s) 108 in response to contact made with a surface of the computing device 100. In block 1904, the IBSM 114 receives movement input information from the movement input mechanism(s) 110 in response to movement of the computing device 100. In block 1906, the IBSM 114 determines whether the touch input information and the movement input information correspond to a multi-touch-movement (MTM) gesture. As explained in Section A, a user performs an MTM gesture by establishing two or more contacts with a surface of the computing device 100, in conjunction with moving the computing device 100 in a prescribed manner. In some cases, the user applies the contacts using two hands which are also used to grasp the computing device 100. In block 1908, the IBSM 114 performs any behavior that is associated with the MTM gesture that has been detected in block 1906.

C. Representative Computing Functionality

FIG. 20 sets forth illustrative computing functionality 2000 that can be used to implement any aspect of the functions described above. For example, the computing functionality 2000 can be used to implement any aspect of the IBSM 114. In one case, the computing functionality 2000 may correspond to any type of computing device that includes one or more processing devices. In all cases, the computing functionality 2000 represents one or more physical and tangible processing mechanisms.

The computing functionality 2000 can include volatile and non-volatile memory, such as RAM 2002 and ROM 2004, as well as one or more processing device(s) 2006 (e.g., one or more CPUs, and/or one or more GPUs, etc.). The computing functionality 2000 also optionally includes various media devices 2008, such as a hard disk module, an optical disk module, and so forth. The computing functionality 2000 can perform various operations identified above when the processing device(s) 2006 executes instructions that are maintained by memory (e.g., RAM 2002, ROM 2004, and/or elsewhere).

More generally, instructions and other information can be stored on any computer readable medium 2010, including, but not limited to, static memory storage devices, magnetic storage devices, optical storage devices, and so on. The term computer readable medium also encompasses plural storage devices. In all cases, the computer readable medium 2010 represents some form of physical and tangible entity.

The computing functionality 2000 also includes an input/output module 1712 for receiving various inputs (via input modules 2014), and for providing various outputs (via output modules). One particular output mechanism may include a presentation module 2016 and an associated graphical user interface (GUI) 2018. The computing functionality 2000 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area network, a wide area network (e.g., the Internet), etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a tablet computing device, for detecting gestures, comprising:
   receiving touch input information from at least one touch input mechanism, in response to a user touching the computing device;
   receiving movement input information from at least one movement input mechanism, in response to movement of the computing device;
   determining whether the touch input information and the movement input information indicate that the user has performed or is performing a multi-touch-movement gesture,
   where the multi-touch-movement gesture entails:
      establishing two or more contacts with a surface of the computing device by a user who grasps the computing device with two hands during use; and
      moving the computing device to establish a prescribed posture;
   after determining that the user has performed a multi-touch-movement gesture, evaluating data from one or more sensors of the tablet computing device to determine whether a predefined telltale noise signature representing a predefined pattern of behavior has occurred; and
   cancelling implementation of the multi-touch-movement gesture when the predefined telltale noise signature has occurred.

2. The method of claim 1, wherein said two or more contacts correspond to two hand contacts placed at two respective points along a peripheral region of the surface of the computing device.

3. The method of claim 2, wherein the two hand contacts are placed on or near two corners of the computing device.

4. The method of claim 2, wherein the peripheral region includes two opposing edges have respective lengths, and wherein the two hand contacts are placed on or near points that are midway along the respective lengths of the two edges.

5. The method of claim 1, wherein said two or more contacts include at least a first contact placed on a first surface of the computing device, and a second contact placed on a second surface of the computing device, the first surface and the second surface having normals pointed in generally opposite directions.

6. The method of claim 2, further comprising moving the computing device to establish a prescribed path that corresponds to a tilting movement whereby the computing device is rotated about an axis that runs generally through the two hand contacts.

7. The method of claim 2, further comprising moving the computing device to establish a prescribed path that corresponds to a flipping movement whereby the computing device is rotated about an axis that runs generally along an edge of the computing device.

8. The method of claim 2, further comprising moving the computing device to establish a prescribed path that corresponds to a pivoting movement whereby the computing device is rotated in a plane that is generally parallel to the surface of the computing device.

9. The method of claim 2, wherein the two hand contacts correspond to a first hand contact and a second hand contact, and further comprising moving the computing device to establish a prescribed path that corresponds to a twisting movement whereby the first hand contact is moved towards a reference point and the second hand contact is moved away from the reference point.

10. The method of claim 1, wherein the multi-touch-movement gesture is defined, at least in part, based on a manner in which the computing device is moved over a prescribed path, as characterized by one or more of: a speed of the computing device; an acceleration of the computing device; and a deceleration of the computing device.

11. The method of claim 1, wherein the prescribed posture defines a prescribed tilt of a display surface of the computing device.

12. The method of claim 1, wherein the computing device includes at least a first second section and a second section,
wherein said two or more contacts correspond to two hand contacts, a first hand contact placed on a surface of the first section, and a second hand contact placed on a surface of the second section,
wherein said moving involves moving the first section with respect to the second section.

13. The method of claim 1, further comprising invoking a view in response to determining that the user has performed or is performing a multi-touch-movement gesture, where the view shows individual items in a layered collection of items.

14. The method of claim 1, further comprising invoking an interaction experience in response to determining that the user has performed or is performing a multi-touch-movement gesture, where the interaction experience facilitates interaction with the computing device for a condition that is assumed to affect the user in a current state.

15. The method of claim 1, further comprising invoking a toolbar selection in response to determining that the user has performed or is performing a multi-touch-movement gesture.

16. The method of claim 1, further comprising invoking an interface page in response to determining that the user has performed or is performing a multi-touch-movement gesture.

17. The method of claim 1, further comprising invoking an application or an operating system function in response to determining that the user has performed or is performing a multi-touch-movement gesture.

18. A computer readable storage device for storing computer readable instructions, the computer readable instructions providing an interpretation and behavior selection module (IBSM) when the instructions are executed by one or more processing devices, the computer readable instructions comprising:
logic configured to receive touch input information from at least one touch input mechanism of a tablet computing device, in response to a user touching the computing device;
logic configured to receive movement input information from at least one movement input mechanism, in response to movement of the computing device;
logic configured to determine whether the touch input information and the movement input information indicate that the user has made or is making a multi-touch-movement gesture by:
determining that the user has applied at least two hand contacts at two respective points along a peripheral region of a display surface of the computing device, using two hands that are also used to grasp the computing device; and
determining that the user has rotated the computing device in a prescribed manner while touching the display surface with said at least two hand contacts;
after determining that the user has performed a multi-touch-movement gesture, evaluating data from one or more sensors of the tablet computing device to determine whether a predefined telltale noise signature representing a predefined pattern of behavior has occurred; and
logic configured perform an action in response to determining that the user has performed a multi-touch-movement gesture unless the predefined telltale noise signature has occurred.

19. A booklet computing device, comprising:
at least a first section and a second section;
a hinged coupling mechanism for movably coupling the first section to the second section, each section comprising a separate display device;
at least one touch input mechanism configured to receive touch input information in response to a user touching the first section or the second section, or both the first section and the second section;
at least one movement input mechanism configured to receive movement input information in response to movement of the booklet computing device, including:
movement applied to both the first section and the second section; and
movement of the first section relative to the second section; and
a gesture matching module configured to:
receive the touch input information from said at least one touch input mechanism, and the movement input information from said at least one movement input mechanism;
determine whether the touch input information and the movement input information indicate that a user has performed or is performing a multi-touch-movement gesture,
where the multi-touch-movement gesture entails:
establishing two or more contacts with the booklet computing device, using two hands that are also used to grasp the booklet computing device; and
moving the sections of the booklet computing device relative to each other;
a noise cancelling mechanism that, after determining that the user has performed a multi-touch-movement gesture, evaluates data from one or more sensors of the booklet computing device to determine whether a predefined telltale noise signature representing a predefined pattern of behavior has occurred; and
wherein the noise cancelling mechanism cancels implementation of the multi-touch-movement gesture when the predefined telltale noise signature has occurred.

20. The booklet computing device of claim 19, wherein the gesture matching module is configured to detect different multi-touch-movement gestures for different static poses that are maintained for a prescribed period of time that achieve different respective angular separations between the first section and the second section.

\* \* \* \* \*